(12) United States Patent
Taylor et al.

(10) Patent No.: US 8,000,894 B2
(45) Date of Patent: *Aug. 16, 2011

(54) VEHICULAR WIRELESS COMMUNICATION SYSTEM

(75) Inventors: David W. Taylor, Fenton, MI (US);
Kevin C. McCarthy, Tucson, AZ (US);
Niall R. Lynam, Holland, MI (US);
Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 7 days.

This patent is subject to a terminal disclaimer.

(21) Appl. No.: 12/908,481

(22) Filed: Oct. 20, 2010

(65) Prior Publication Data

US 2011/0035120 A1 Feb. 10, 2011

Related U.S. Application Data

(63) Continuation of application No. 12/724,895, filed on Mar. 16, 2010, now Pat. No. 7,822,543, which is a continuation of application No. 12/405,614, filed on Mar. 17, 2009, now Pat. No. 7,711,479, which is a continuation of application No. 11/935,800, filed on Nov. 6, 2007, now Pat. No. 7,571,042, which is a continuation of application No. 11/624,381, filed on Jan. 18, 2007, now Pat. No. 7,490,007, which is a continuation of application No. 10/645,762, filed on Aug. 20, 2003, now Pat. No. 7,167,796, and a continuation-in-part of application No. 10/456,599, filed on Jun. 6, 2003, now Pat. No. 7,004,593, and a continuation-in-part of application No. 10/287,178, filed on Nov. 4, 2002, now Pat. No. 6,678,614, which is a continuation of application No. 09/799,414, filed on Mar. 5, 2001, now Pat. No. 6,477,464, and a continuation-in-part of application No. 10/755,915, filed on Jan. 13, 2004, now Pat. No. 7,446,650, which is a continuation of application No. 09/793,002, filed on Feb. 26, 2001, now Pat. No. 6,690,268, and a continuation-in-part of application No. 10/054,633, filed on Jan. 22, 2002, now Pat. No. 7,195,381, and a continuation-in-part of application No. 09/793,002, filed on Feb. 26, 2001, now Pat. No. 6,690,268.

(60) Provisional application No. 60/406,166, filed on Aug. 27, 2002, provisional application No. 60/405,392, filed on Aug. 23, 2002, provisional application No. 60/404,906, filed on Aug. 21, 2002, provisional application No. 60/187,960, filed on Mar. 9, 2000, provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/186,520, filed on Mar. 2, 2000, provisional application No. 60/346,733, filed on Jan. 7, 2002, provisional application No. 60/263,680, filed on Jan. 23, 2001, provisional application No. 60/271,466, filed on Feb. 26, 2001, provisional application No. 60/315,384, filed on Aug. 28, 2001.

(51) Int. Cl.
*G01C 21/30* (2006.01)

(52) U.S. Cl. ............ 701/208; 701/36; 701/49; 701/211; 362/494

(58) Field of Classification Search ............... 701/49, 701/208, 211, 213, 214, 300, 1, 36; 362/494; 342/357.22
See application file for complete search history.

(56) References Cited

U.S. PATENT DOCUMENTS

| | | | |
|---|---|---|---|
| 1,096,452 | A | 5/1914 | Perrin |
| 1,563,258 | A | 11/1925 | Cunningham |
| 2,069,368 | A | 2/1937 | Horinstein |
| 2,166,303 | A | 7/1939 | Hodny et al. |
| 2,263,382 | A | 11/1941 | Gotzinger |
| 2,414,223 | A | 1/1947 | DeVirgilis |

| | | |
|---|---|---|
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |

| | | | | | |
|---|---|---|---|---|---|
| 4,827,086 A | 5/1989 | Rockwell | 5,145,609 A | 9/1992 | Varaprasad et al. |
| 4,837,551 A | 6/1989 | Iino | 5,150,232 A | 9/1992 | Gunkima et al. |
| 4,845,402 A | 7/1989 | Smith | 5,151,816 A | 9/1992 | Varaprasad et al. |
| 4,847,772 A | 7/1989 | Michalopoulos et al. | 5,151,824 A | 9/1992 | O'Farrell |
| 4,855,161 A | 8/1989 | Moser et al. | 5,154,617 A | 10/1992 | Suman et al. |
| 4,855,550 A | 8/1989 | Schultz, Jr. | 5,158,638 A | 10/1992 | Osanami et al. |
| 4,859,813 A | 8/1989 | Rockwell | 5,160,200 A | 11/1992 | Cheselske |
| 4,859,867 A | 8/1989 | Larson et al. | 5,160,201 A | 11/1992 | Wrobel |
| 4,862,594 A | 9/1989 | Schierbeek et al. | 5,168,378 A | 12/1992 | Black et al. |
| 4,871,917 A | 10/1989 | O'Farrell et al. | 5,173,881 A | 12/1992 | Sindle |
| 4,872,051 A | 10/1989 | Dye | 5,177,031 A | 1/1993 | Buchmann et al. |
| 4,882,466 A | 11/1989 | Friel | 5,178,448 A | 1/1993 | Adams et al. |
| 4,882,565 A | 11/1989 | Gallmeyer | 5,179,471 A | 1/1993 | Caskey et al. |
| 4,883,349 A | 11/1989 | Mittelhäuser | 5,183,099 A | 2/1993 | Bechu |
| 4,884,135 A | 11/1989 | Schiffman | 5,184,956 A | 2/1993 | Langlarais et al. |
| 4,886,960 A | 12/1989 | Molyneux et al. | 5,189,537 A | 2/1993 | O'Farrell |
| 4,891,828 A | 1/1990 | Kawazoe | 5,193,029 A | 3/1993 | Schofield et al. |
| 4,892,345 A | 1/1990 | Rachael, III | 5,197,562 A | 3/1993 | Kakinama et al. |
| 4,902,103 A | 2/1990 | Miyake et al. | 5,207,492 A | 5/1993 | Roberts |
| 4,902,108 A | 2/1990 | Byker | 5,210,967 A | 5/1993 | Brown |
| 4,906,085 A | 3/1990 | Sugihara et al. | 5,214,408 A | 5/1993 | Asayama |
| 4,910,591 A | 3/1990 | Petrossian et al. | 5,217,794 A | 6/1993 | Schrenk |
| 4,916,374 A | 4/1990 | Schierbeek et al. | 5,223,814 A | 6/1993 | Suman |
| 4,926,170 A | 5/1990 | Beggs et al. | 5,223,844 A | 6/1993 | Mansell et al. |
| 4,930,742 A | 6/1990 | Schofield et al. | 5,229,975 A | 7/1993 | Truesdell et al. |
| 4,935,665 A | 6/1990 | Murata | 5,230,400 A | 7/1993 | Kakinama et al. |
| 4,936,533 A | 6/1990 | Adams et al. | 5,233,461 A | 8/1993 | Dornan et al. |
| 4,937,796 A | 6/1990 | Tendler | 5,235,316 A | 8/1993 | Qualizza |
| 4,937,945 A | 7/1990 | Schofield et al. | 5,239,405 A | 8/1993 | Varaprasad et al. |
| 4,943,796 A | 7/1990 | Lee | 5,239,406 A | 8/1993 | Lynam |
| 4,948,242 A | 8/1990 | Desmond et al. | 5,243,417 A | 9/1993 | Pollard |
| 4,953,305 A | 9/1990 | Van Lente et al. | 5,245,422 A | 9/1993 | Borcherts et al. |
| 4,956,591 A | 9/1990 | Schierbeek et al. | 5,252,354 A | 10/1993 | Cronin et al. |
| 4,959,247 A | 9/1990 | Moser et al. | 5,253,109 A | 10/1993 | O'Farrell et al. |
| 4,959,865 A | 9/1990 | Stettiner et al. | 5,255,442 A | 10/1993 | Schierbeek et al. |
| 4,970,653 A | 11/1990 | Kenue | 5,260,626 A | 11/1993 | Takase et al. |
| 4,973,844 A | 11/1990 | O'Farrell et al. | 5,277,986 A | 1/1994 | Cronin et al. |
| 4,978,196 A | 12/1990 | Suzuki et al. | 5,280,555 A | 1/1994 | Ainsburg |
| 4,983,951 A | 1/1991 | Igarashi et al. | 5,285,060 A | 2/1994 | Larson et al. |
| 4,987,357 A | 1/1991 | Masaki | 5,289,321 A | 2/1994 | Secor |
| 4,996,083 A | 2/1991 | Moser et al. | 5,296,924 A | 3/1994 | de Saint Blancard et al. |
| 5,001,386 A | 3/1991 | Sullivan et al. | 5,303,205 A | 4/1994 | Gauthier et al. |
| 5,001,558 A | 3/1991 | Burley et al. | 5,304,980 A | 4/1994 | Maekawa |
| 5,005,213 A | 4/1991 | Hanson et al. | 5,305,012 A | 4/1994 | Faris |
| 5,006,971 A | 4/1991 | Jenkins | 5,307,136 A | 4/1994 | Saneyoshi |
| 5,014,167 A | 5/1991 | Roberts | 5,313,335 A | 5/1994 | Gray et al. |
| 5,016,996 A | 5/1991 | Ueno | 5,325,096 A | 6/1994 | Pakett |
| 5,017,903 A | 5/1991 | Krippelz, Sr. | 5,325,386 A | 6/1994 | Jewell et al. |
| 5,027,200 A | 6/1991 | Petrossian et al. | 5,327,288 A | 7/1994 | Wellington et al. |
| 5,037,182 A | 8/1991 | Groves et al. | 5,330,149 A | 7/1994 | Haan et al. |
| 5,038,255 A | 8/1991 | Nishihashi et al. | 5,331,312 A | 7/1994 | Kudoh |
| 5,052,163 A | 10/1991 | Czekala | 5,331,358 A | 7/1994 | Schurle et al. |
| 5,056,899 A | 10/1991 | Warszawski | 5,339,075 A | 8/1994 | Abst et al. |
| 5,058,851 A | 10/1991 | Lawlor et al. | 5,339,529 A | 8/1994 | Lindberg |
| 5,059,015 A | 10/1991 | Tran | 5,341,437 A | 8/1994 | Nakayama |
| 5,066,108 A | 11/1991 | McDonald | D351,370 S | 10/1994 | Lawlor et al. |
| 5,066,112 A | 11/1991 | Lynam et al. | 5,354,965 A | 10/1994 | Lee |
| 5,069,535 A | 12/1991 | Baucke et al. | 5,355,118 A | 10/1994 | Fukuhara |
| 5,070,323 A | 12/1991 | Iino et al. | 5,355,245 A | 10/1994 | Lynam |
| 5,073,012 A | 12/1991 | Lynam | 5,355,284 A | 10/1994 | Roberts |
| 5,076,673 A | 12/1991 | Lynam et al. | 5,361,190 A | 11/1994 | Roberts et al. |
| 5,076,674 A | 12/1991 | Lynam | 5,371,659 A | 12/1994 | Pastrick et al. |
| 5,078,480 A | 1/1992 | Warszawski | 5,373,482 A | 12/1994 | Gauthier |
| 5,096,287 A | 3/1992 | Kakinami et al. | 5,379,146 A | 1/1995 | Defendini |
| 5,100,095 A | 3/1992 | Haan et al. | 5,386,285 A | 1/1995 | Asayama |
| 5,101,139 A | 3/1992 | Lechter | 5,386,306 A | 1/1995 | Gunjima et al. |
| 5,105,127 A | 4/1992 | Lavaud et al. | 5,400,158 A | 3/1995 | Ohnishi et al. |
| 5,115,346 A | 5/1992 | Lynam | 5,402,103 A | 3/1995 | Tashiro |
| 5,117,346 A | 5/1992 | Gard | 5,406,395 A | 4/1995 | Wilson et al. |
| 5,121,200 A | 6/1992 | Choi | 5,406,414 A | 4/1995 | O'Farrell et al. |
| 5,122,619 A | 6/1992 | Dlubak | 5,408,353 A | 4/1995 | Nichols et al. |
| 5,124,845 A | 6/1992 | Shimojo | 5,408,357 A | 4/1995 | Beukema |
| 5,128,799 A | 7/1992 | Byker | 5,410,346 A | 4/1995 | Saneyoshi et al. |
| 5,131,154 A | 7/1992 | Schierbeek et al. | 5,414,439 A | 5/1995 | Groves et al. |
| 5,135,298 A | 8/1992 | Feltman | 5,414,461 A | 5/1995 | Kishi et al. |
| 5,136,483 A | 8/1992 | Schöniger et al. | 5,416,313 A | 5/1995 | Larson et al. |
| 5,140,455 A | 8/1992 | Varaprasad et al. | 5,416,478 A | 5/1995 | Morinaga |
| 5,140,465 A | 8/1992 | Yasui et al. | 5,418,610 A | 5/1995 | Fischer |
| 5,142,407 A | 8/1992 | Varaprasad et al. | 5,422,756 A | 6/1995 | Weber |

| | | |
|---|---|---|
| 5,424,726 A | 6/1995 | Beymer |
| 5,424,865 A | 6/1995 | Lynam |
| 5,424,952 A | 6/1995 | Asayama |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,509,606 A | 4/1996 | Breithaupt et al. |
| 5,510,983 A | 4/1996 | Iino |
| 5,515,448 A | 5/1996 | Nishitani |
| 5,519,621 A | 5/1996 | Worthman |
| 5,521,744 A | 5/1996 | Mazurek |
| 5,521,760 A | 5/1996 | DeYoung et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenck et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,594,222 A | 1/1997 | Caldwell |
| 5,594,615 A | 1/1997 | Spijkerman et al. |
| 5,602,542 A | 2/1997 | Widmann |
| 5,602,670 A | 2/1997 | Keegan |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,157 A | 9/1997 | Aviv |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,689,241 A | 11/1997 | Clark, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,699,044 A | 12/1997 | Van Lente et al. |
| 5,699,188 A | 12/1997 | Gilbert et al. |
| 5,703,568 A | 12/1997 | Hegyi |
| 5,708,410 A | 1/1998 | Blank et al. |
| 5,708,415 A | 1/1998 | Van Lente et al. |
| 5,708,857 A | 1/1998 | Ishibashi |
| 5,715,093 A | 2/1998 | Schierbeek et al. |
| 5,724,187 A | 3/1998 | Varaprasad et al. |
| 5,724,316 A | 3/1998 | Brunts |
| 5,729,194 A | 3/1998 | Spears et al. |
| 5,737,226 A | 4/1998 | Olson et al. |
| 5,741,966 A | 4/1998 | Handfield et al. |
| 5,744,227 A | 4/1998 | Bright et al. |
| 5,745,050 A | 4/1998 | Nakagawa |
| 5,745,266 A | 4/1998 | Smith |
| 5,748,172 A | 5/1998 | Song et al. |
| 5,748,287 A | 5/1998 | Takahashi et al. |
| 5,751,211 A | 5/1998 | Shirai et al. |
| 5,751,246 A | 5/1998 | Hertel |
| 5,751,390 A | 5/1998 | Crawford et al. |
| 5,751,489 A | 5/1998 | Caskey et al. |
| 5,754,099 A | 5/1998 | Nishimura et al. |
| D394,833 S | 6/1998 | Muth |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,762,823 A | 6/1998 | Hikmet |
| 5,764,139 A | 6/1998 | Nojima et al. |
| 5,765,940 A | 6/1998 | Levy et al. |
| 5,767,793 A | 6/1998 | Agravante et al. |
| 5,768,020 A | 6/1998 | Nagao |
| 5,775,762 A | 7/1998 | Vitito |
| 5,777,779 A | 7/1998 | Hashimoto et al. |
| 5,780,160 A | 7/1998 | Allemand et al. |
| 5,786,772 A | 7/1998 | Schofield et al. |
| 5,788,357 A | 8/1998 | Muth et al. |
| 5,790,298 A | 8/1998 | Tonar |
| 5,790,973 A | 8/1998 | Blaker et al. |

| | | | | | | |
|---|---|---|---|---|---|---|
| 5,793,308 A | 8/1998 | Rosinski et al. | | 5,965,247 A | 10/1999 | Jonza et al. |
| 5,793,420 A | 8/1998 | Schmidt | | 5,968,538 A | 10/1999 | Snyder, Jr. |
| 5,796,094 A | 8/1998 | Schofield et al. | | 5,971,552 A | 10/1999 | O'Farrell et al. |
| 5,796,176 A | 8/1998 | Kramer et al. | | 5,973,760 A | 10/1999 | Dehmlow |
| 5,798,057 A | 8/1998 | Hikmet | | 5,975,715 A | 11/1999 | Bauder |
| 5,798,575 A | 8/1998 | O'Farrell et al. | | 5,984,482 A | 11/1999 | Rumsey et al. |
| 5,798,688 A | 8/1998 | Schofield | | 5,986,730 A | 11/1999 | Hansen et al. |
| 5,800,918 A | 9/1998 | Chartier et al. | | 5,990,469 A | 11/1999 | Bechtel et al. |
| 5,802,727 A | 9/1998 | Blank et al. | | 5,990,625 A | 11/1999 | Meissner et al. |
| 5,803,579 A | 9/1998 | Turnbull et al. | | 5,995,180 A | 11/1999 | Moriwaki et al. |
| 5,805,330 A | 9/1998 | Byker et al. | | 5,998,617 A | 12/1999 | Srinivasa et al. |
| 5,805,367 A | 9/1998 | Kanazawa | | 5,998,929 A | 12/1999 | Bechtel et al. |
| 5,806,879 A | 9/1998 | Hamada et al. | | 6,000,823 A | 12/1999 | Desmond et al. |
| 5,806,965 A | 9/1998 | Deese | | 6,001,486 A | 12/1999 | Varaprasad et al. |
| 5,808,197 A | 9/1998 | Dao | | 6,002,511 A | 12/1999 | Varaprasad et al. |
| 5,808,566 A | 9/1998 | Behr et al. | | 6,002,544 A | 12/1999 | Yatsu |
| 5,808,589 A | 9/1998 | Fergason | | 6,002,983 A | 12/1999 | Alland et al. |
| 5,808,713 A | 9/1998 | Broer et al. | | 6,005,724 A | 12/1999 | Todd |
| 5,808,777 A | 9/1998 | Lynam et al. | | 6,007,222 A | 12/1999 | Thau |
| 5,808,778 A | 9/1998 | Bauer et al. | | 6,008,486 A | 12/1999 | Stam et al. |
| 5,812,321 A | 9/1998 | Schierbeek et al. | | 6,008,871 A | 12/1999 | Okumura |
| 5,813,745 A | 9/1998 | Fant, Jr. et al. | | 6,009,359 A | 12/1999 | El-Hakim et al. |
| 5,818,625 A | 10/1998 | Forgette et al. | | 6,016,035 A | 1/2000 | Eberspächer et al. |
| 5,820,097 A | 10/1998 | Spooner | | 6,016,215 A | 1/2000 | Byker |
| 5,820,245 A | 10/1998 | Desmond et al. | | 6,019,411 A | 2/2000 | Carter et al. |
| 5,822,023 A | 10/1998 | Suman et al. | | 6,019,475 A | 2/2000 | Lynam et al. |
| 5,823,654 A | 10/1998 | Pastrick et al. | | 6,020,987 A | 2/2000 | Baumann et al. |
| 5,825,527 A | 10/1998 | Forgette et al. | | 6,021,371 A | 2/2000 | Fultz |
| 5,835,166 A | 11/1998 | Hall et al. | | 6,023,229 A | 2/2000 | Bugno et al. |
| 5,837,994 A | 11/1998 | Stam et al. | | 6,025,872 A | 2/2000 | Ozaki et al. |
| 5,844,505 A | 12/1998 | Van Ryzin | | 6,028,537 A | 2/2000 | Suman et al. |
| 5,848,373 A | 12/1998 | DeLorme et al. | | 6,037,689 A | 3/2000 | Bingle et al. |
| 5,850,176 A | 12/1998 | Kinoshita et al. | | 6,040,939 A | 3/2000 | Demiryont et al. |
| 5,850,205 A | 12/1998 | Blouin | | 6,042,253 A | 3/2000 | Fant, Jr. et al. |
| 5,863,116 A | 1/1999 | Pastrick et al. | | 6,042,934 A | 3/2000 | Guiselin et al. |
| 5,864,419 A | 1/1999 | Lynam | | 6,045,243 A | 4/2000 | Muth et al. |
| 5,867,801 A | 2/1999 | Denny | | 6,045,643 A | 4/2000 | Byker et al. |
| 5,871,275 A | 2/1999 | O'Farrell et al. | | 6,046,766 A | 4/2000 | Sakata |
| 5,871,843 A | 2/1999 | Yoneda et al. | | 6,046,837 A | 4/2000 | Yamamoto |
| 5,877,707 A | 3/1999 | Kowalick | | 6,049,171 A | 4/2000 | Stam et al. |
| 5,877,897 A | 3/1999 | Schofield et al. | | D425,466 S | 5/2000 | Todd et al. |
| 5,878,353 A | 3/1999 | ul Azam et al. | | 6,060,989 A | 5/2000 | Gehlot |
| 5,878,370 A | 3/1999 | Olson | | 6,061,002 A | 5/2000 | Weber et al. |
| 5,879,074 A | 3/1999 | Pastrick | | 6,062,920 A | 5/2000 | Jordan et al. |
| 5,883,605 A | 3/1999 | Knapp | | 6,064,508 A | 5/2000 | Forgette et al. |
| 5,883,739 A | 3/1999 | Ashihara et al. | | 6,065,840 A | 5/2000 | Caskey et al. |
| 5,888,431 A | 3/1999 | Tonar et al. | | 6,066,920 A | 5/2000 | Torihara et al. |
| D409,540 S | 5/1999 | Muth | | 6,067,111 A | 5/2000 | Hahn et al. |
| 5,899,551 A | 5/1999 | Neijzen et al. | | 6,067,500 A | 5/2000 | Morimoto et al. |
| 5,899,956 A | 5/1999 | Chan | | 6,068,380 A | 5/2000 | Lynn et al. |
| 5,904,729 A | 5/1999 | Ruzicka | | D426,506 S | 6/2000 | Todd et al. |
| 5,910,854 A | 6/1999 | Varaprasad et al. | | D426,507 S | 6/2000 | Todd et al. |
| 5,914,815 A | 6/1999 | Bos | | D427,128 S | 6/2000 | Mathieu |
| 5,917,664 A | 6/1999 | O'Neill et al. | | 6,072,391 A | 6/2000 | Suzukie et al. |
| 5,918,180 A | 6/1999 | Dimino | | 6,074,077 A | 6/2000 | Pastrick et al. |
| 5,922,176 A | 7/1999 | Caskey | | 6,074,777 A | 6/2000 | Reimers et al. |
| 5,923,027 A | 7/1999 | Stam et al. | | 6,076,948 A | 6/2000 | Bukosky et al. |
| 5,923,457 A | 7/1999 | Byker et al. | | 6,078,355 A | 6/2000 | Zengel |
| 5,924,212 A | 7/1999 | Domanski | | 6,078,865 A | 6/2000 | Koyanagi |
| 5,926,087 A | 7/1999 | Busch et al. | | D428,372 S | 7/2000 | Todd et al. |
| 5,927,792 A | 7/1999 | Welling et al. | | D428,373 S | 7/2000 | Todd et al. |
| 5,928,572 A | 7/1999 | Tonar et al. | | 6,082,881 A | 7/2000 | Hicks |
| 5,929,786 A | 7/1999 | Schofield et al. | | 6,084,700 A | 7/2000 | Knapp et al. |
| 5,935,702 A | 8/1999 | Macquart et al. | | 6,086,131 A | 7/2000 | Bingle et al. |
| 5,938,320 A | 8/1999 | Crandall | | 6,086,229 A | 7/2000 | Pastrick |
| 5,938,321 A | 8/1999 | Bos et al. | | 6,087,012 A | 7/2000 | Varaprasad et al. |
| 5,938,721 A | 8/1999 | Dussell et al. | | 6,087,953 A | 7/2000 | DeLine et al. |
| 5,940,011 A | 8/1999 | Agravante et al. | | 6,091,343 A | 7/2000 | Dykema et al. |
| 5,940,120 A | 8/1999 | Frankhouse et al. | | 6,093,976 A | 7/2000 | Kramer et al. |
| 5,940,201 A | 8/1999 | Ash et al. | | 6,094,618 A | 7/2000 | Harada |
| 5,942,895 A | 8/1999 | Popovic et al. | | D428,842 S | 8/2000 | Todd et al. |
| 5,947,586 A | 9/1999 | Weber | | D429,202 S | 8/2000 | Todd et al. |
| 5,949,331 A | 9/1999 | Schofield et al. | | D430,088 S | 8/2000 | Todd et al. |
| 5,956,079 A | 9/1999 | Ridgley | | 6,097,023 A | 8/2000 | Schofield et al. |
| 5,956,181 A | 9/1999 | Lin | | 6,097,316 A | 8/2000 | Liaw et al. |
| 5,959,367 A | 9/1999 | O'Farrell et al. | | 6,099,131 A | 8/2000 | Fletcher et al. |
| 5,959,555 A | 9/1999 | Furuta | | 6,099,155 A | 8/2000 | Pastrick et al. |
| 5,959,577 A | 9/1999 | Fan et al. | | 6,102,546 A | 8/2000 | Carter |
| 5,963,247 A | 10/1999 | Banitt | | 6,102,559 A | 8/2000 | Nold et al. |

| | | | | | | | |
|---|---|---|---|---|---|---|---|
| 6,104,552 | A | 8/2000 | Thau et al. | 6,210,012 | B1 | 4/2001 | Broer |
| 6,106,121 | A | 8/2000 | Buckley et al. | 6,212,470 | B1 | 4/2001 | Seymour et al. |
| 6,111,498 | A | 8/2000 | Jobes et al. | 6,217,181 | B1 | 4/2001 | Lynam et al. |
| 6,111,683 | A | 8/2000 | Cammenga et al. | 6,218,934 | B1 | 4/2001 | Regan |
| 6,111,684 | A | 8/2000 | Forgette et al. | 6,222,447 | B1 | 4/2001 | Schofield et al. |
| 6,111,685 | A | 8/2000 | Tench et al. | 6,222,460 | B1 | 4/2001 | DeLine et al. |
| 6,111,696 | A | 8/2000 | Allen et al. | 6,222,689 | B1 | 4/2001 | Higuchi et al. |
| 6,115,086 | A | 9/2000 | Rosen | 6,227,689 | B1 | 5/2001 | Miller |
| 6,115,651 | A | 9/2000 | Cruz | 6,232,937 | B1 | 5/2001 | Jacobsen et al. |
| 6,116,743 | A | 9/2000 | Hoek | 6,239,851 | B1 | 5/2001 | Hatazawa et al. |
| 6,118,219 | A | 9/2000 | Okigami et al. | 6,239,898 | B1 | 5/2001 | Byker et al. |
| 6,122,597 | A | 9/2000 | Saneyoshi et al. | 6,239,899 | B1 | 5/2001 | DeVries et al. |
| 6,122,921 | A | 9/2000 | Brezoczky et al. | 6,243,003 | B1 | 6/2001 | DeLine et al. |
| 6,124,647 | A | 9/2000 | Marcus et al. | 6,244,716 | B1 | 6/2001 | Steenwyk et al. |
| 6,124,886 | A | 9/2000 | DeLine et al. | 6,245,262 | B1 | 6/2001 | Varaprasad et al. |
| 6,127,919 | A | 10/2000 | Wylin | 6,247,820 | B1 | 6/2001 | Van Order |
| 6,127,945 | A | 10/2000 | Mura-Smith | 6,249,214 | B1 | 6/2001 | Kashiwazaki |
| 6,128,576 | A | 10/2000 | Nishimoto et al. | 6,249,310 | B1 | 6/2001 | Lefkowitz |
| 6,130,421 | A | 10/2000 | Bechtel et al. | 6,249,369 | B1 | 6/2001 | Theiste et al. |
| 6,130,448 | A | 10/2000 | Bauer et al. | 6,250,148 | B1 | 6/2001 | Lynam |
| 6,132,072 | A | 10/2000 | Turnbull et al. | 6,250,766 | B1 | 6/2001 | Strumolo et al. |
| 6,137,620 | A | 10/2000 | Guarr et al. | 6,250,783 | B1 | 6/2001 | Stidham et al. |
| 6,139,171 | A | 10/2000 | Waldmann | 6,255,639 | B1 | 7/2001 | Stam et al. |
| 6,139,172 | A | 10/2000 | Bos et al. | 6,257,746 | B1 | 7/2001 | Todd et al. |
| 6,140,933 | A | 10/2000 | Bugno et al. | 6,259,412 | B1 | 7/2001 | Duroux |
| 6,142,656 | A | 11/2000 | Kurth | 6,259,475 | B1 | 7/2001 | Ramachandran et al. |
| 6,146,003 | A | 11/2000 | Thau | 6,260,608 | B1 | 7/2001 | Kim |
| 6,147,934 | A | 11/2000 | Arikawa et al. | 6,262,842 | B1 | 7/2001 | Ouderkirk et al. |
| 6,148,261 | A | 11/2000 | Obradovich et al. | 6,264,353 | B1 | 7/2001 | Caraher et al. |
| 6,149,287 | A | 11/2000 | Pastrick et al. | 6,265,968 | B1 | 7/2001 | Betzitza et al. |
| 6,150,014 | A | 11/2000 | Chu et al. | 6,268,803 | B1 | 7/2001 | Gunderson et al. |
| 6,151,065 | A | 11/2000 | Steed et al. | 6,268,837 | B1 | 7/2001 | Kobayashi et al. |
| 6,151,539 | A | 11/2000 | Bergholz et al. | 6,269,308 | B1 | 7/2001 | Kodaka et al. |
| 6,152,551 | A | 11/2000 | Annas | 6,271,901 | B1 | 8/2001 | Ide et al. |
| 6,152,590 | A | 11/2000 | Fürst et al. | 6,274,221 | B2 | 8/2001 | Smith et al. |
| 6,154,149 | A | 11/2000 | Tyckowski et al. | 6,276,821 | B1 | 8/2001 | Pastrick et al. |
| 6,154,306 | A | 11/2000 | Varaprasad et al. | 6,276,822 | B1 | 8/2001 | Bedrosian et al. |
| 6,157,294 | A | 12/2000 | Urai et al. | 6,277,471 | B1 | 8/2001 | Tang |
| 6,157,418 | A | 12/2000 | Rosen | 6,278,271 | B1 | 8/2001 | Schott |
| 6,157,480 | A | 12/2000 | Anderson et al. | 6,278,377 | B1 | 8/2001 | DeLine et al. |
| 6,158,655 | A | 12/2000 | DeVries, Jr. et al. | 6,278,941 | B1 | 8/2001 | Yokoyama |
| 6,161,865 | A | 12/2000 | Rose et al. | 6,280,068 | B1 | 8/2001 | Mertens et al. |
| 6,164,564 | A | 12/2000 | Franco et al. | 6,280,069 | B1 | 8/2001 | Pastrick et al. |
| 6,166,625 | A | 12/2000 | Teowee et al. | 6,281,804 | B1 | 8/2001 | Haller et al. |
| 6,166,629 | A | 12/2000 | Hamma et al. | 6,286,965 | B1 | 9/2001 | Caskey et al. |
| 6,166,847 | A | 12/2000 | Tench et al. | 6,286,984 | B1 | 9/2001 | Berg |
| 6,166,848 | A | 12/2000 | Cammenga et al. | 6,289,332 | B2 | 9/2001 | Menig et al. |
| 6,167,755 | B1 | 1/2001 | Damson et al. | 6,290,378 | B1 | 9/2001 | Buchalla et al. |
| 6,169,955 | B1 | 1/2001 | Fultz | 6,291,905 | B1 | 9/2001 | Drummond et al. |
| 6,170,956 | B1 | 1/2001 | Rumsey et al. | 6,291,906 | B1 | 9/2001 | Marcus et al. |
| 6,172,600 | B1 | 1/2001 | Kakinama et al. | 6,294,989 | B1 | 9/2001 | Schofield et al. |
| 6,172,601 | B1 | 1/2001 | Wada et al. | 6,296,379 | B1 | 10/2001 | Pastrick |
| 6,172,613 | B1 | 1/2001 | DeLine et al. | 6,297,781 | B1 | 10/2001 | Turnbull et al. |
| 6,173,501 | B1 | 1/2001 | Blank et al. | 6,299,333 | B1 | 10/2001 | Pastrick et al. |
| 6,175,164 | B1 | 1/2001 | O'Farrell et al. | 6,300,879 | B1 | 10/2001 | Ragan et al. |
| 6,175,300 | B1 | 1/2001 | Kendrick | 6,301,039 | B1 | 10/2001 | Tench |
| 6,176,602 | B1 | 1/2001 | Pastrick et al. | 6,304,173 | B2 | 10/2001 | Pala et al. |
| 6,178,034 | B1 | 1/2001 | Allemand et al. | 6,305,807 | B1 | 10/2001 | Schierbeek |
| 6,178,377 | B1 | 1/2001 | Ishihara et al. | 6,310,611 | B1 | 10/2001 | Caldwell |
| 6,181,387 | B1 | 1/2001 | Rosen | 6,310,714 | B1 | 10/2001 | Lomprey et al. |
| 6,182,006 | B1 | 1/2001 | Meek | 6,310,738 | B1 | 10/2001 | Chu |
| 6,183,119 | B1 | 2/2001 | Desmond et al. | 6,313,454 | B1 | 11/2001 | Bos et al. |
| 6,184,679 | B1 | 2/2001 | Popovic et al. | 6,314,295 | B1 | 11/2001 | Kawamoto |
| 6,184,781 | B1 | 2/2001 | Ramakesavan | 6,315,440 | B1 | 11/2001 | Satoh |
| 6,185,492 | B1 | 2/2001 | Kagawa et al. | 6,317,057 | B1 | 11/2001 | Lee |
| 6,185,501 | B1 | 2/2001 | Smith et al. | 6,317,180 | B1 | 11/2001 | Kuroiwa et al. |
| 6,188,505 | B1 | 2/2001 | Lomprey et al. | 6,317,248 | B1 | 11/2001 | Agrawal et al. |
| 6,191,704 | B1 | 2/2001 | Takenaga et al. | 6,318,870 | B1 | 11/2001 | Spooner et al. |
| 6,193,912 | B1 | 2/2001 | Thieste et al. | 6,320,176 | B1 | 11/2001 | Schofield et al. |
| 6,195,194 | B1 | 2/2001 | Roberts et al. | 6,320,282 | B1 | 11/2001 | Caldwell |
| 6,196,688 | B1 | 3/2001 | Caskey et al. | 6,320,612 | B1 | 11/2001 | Young |
| 6,198,409 | B1 | 3/2001 | Schofield et al. | 6,324,295 | B1 | 11/2001 | Valery et al. |
| 6,199,014 | B1 | 3/2001 | Walker et al. | 6,326,613 | B1 | 12/2001 | Heslin et al. |
| 6,199,810 | B1 | 3/2001 | Wu et al. | 6,326,900 | B2 | 12/2001 | DeLine et al. |
| 6,200,010 | B1 | 3/2001 | Anders | 6,329,925 | B1 | 12/2001 | Skiver et al. |
| 6,201,642 | B1 | 3/2001 | Bos | 6,330,511 | B2 | 12/2001 | Ogura et al. |
| 6,206,553 | B1 | 3/2001 | Boddy et al. | 6,331,066 | B1 | 12/2001 | Desmond et al. |
| 6,207,083 | B1 | 3/2001 | Varaprasad et al. | 6,333,759 | B1 | 12/2001 | Mazzilli |
| 6,210,008 | B1 | 4/2001 | Hoekstra et al. | 6,335,680 | B1 | 1/2002 | Matsuoka |

| Patent | Date | Name | | Patent | Date | Name |
|---|---|---|---|---|---|---|
| 6,336,737 B1 | 1/2002 | Thau | | 6,487,500 B2 | 11/2002 | Lemelson et al. |
| 6,340,850 B2 | 1/2002 | O'Farrell et al. | | 6,494,602 B2 | 12/2002 | Pastrick et al. |
| 6,341,523 B2 | 1/2002 | Lynam | | 6,498,620 B2 | 12/2002 | Schofield et al. |
| 6,344,805 B1 | 2/2002 | Yasui et al. | | 6,501,387 B2 | 12/2002 | Skiver et al. |
| 6,346,698 B1 | 2/2002 | Turnbull | | 6,512,203 B2 | 1/2003 | Jones et al. |
| 6,347,880 B1 | 2/2002 | Fürst et al. | | 6,512,624 B2 | 1/2003 | Tonar et al. |
| 6,348,858 B2 | 2/2002 | Weis et al. | | 6,513,252 B1 * | 2/2003 | Schierbeek et al. ............ 33/356 |
| 6,351,708 B1 | 2/2002 | Takagi et al. | | 6,515,581 B1 | 2/2003 | Ho |
| 6,353,392 B1 | 3/2002 | Schofield et al. | | 6,515,582 B1 | 2/2003 | Teowee |
| 6,356,206 B1 | 3/2002 | Takenaga et al. | | 6,515,597 B1 | 2/2003 | Wada et al. |
| 6,356,376 B1 | 3/2002 | Tonar et al. | | 6,516,664 B2 | 2/2003 | Lynam |
| 6,356,389 B1 | 3/2002 | Nilsen et al. | | 6,519,209 B1 | 2/2003 | Arikawa et al. |
| 6,357,883 B1 | 3/2002 | Strumolo et al. | | 6,520,667 B1 | 2/2003 | Mousseau |
| 6,362,121 B1 | 3/2002 | Chopin et al. | | 6,522,451 B1 | 2/2003 | Lynam |
| 6,362,548 B1 | 3/2002 | Bingle et al. | | 6,522,969 B2 | 2/2003 | Kannonji |
| 6,363,326 B1 | 3/2002 | Scully | | 6,525,707 B1 | 2/2003 | Kaneko et al. |
| 6,366,013 B1 | 4/2002 | Leenders et al. | | 6,534,884 B2 | 3/2003 | Marcus et al. |
| 6,366,213 B2 * | 4/2002 | DeLine et al. ............ 340/815.4 | | 6,538,709 B1 | 3/2003 | Kurihara et al. |
| 6,370,329 B1 | 4/2002 | Teuchert | | 6,539,306 B2 * | 3/2003 | Turnbull ...................... 701/219 |
| 6,371,636 B1 | 4/2002 | Wesson | | 6,542,085 B1 | 4/2003 | Yang |
| 6,379,013 B1 | 4/2002 | Bechtel et al. | | 6,542,182 B1 | 4/2003 | Chautorash |
| 6,379,788 B2 | 4/2002 | Choi et al. | | 6,543,163 B1 | 4/2003 | Ginsberg |
| 6,382,805 B1 | 5/2002 | Miyabukuro | | 6,545,598 B1 | 4/2003 | de Villeroche |
| 6,385,139 B1 | 5/2002 | Arikawa et al. | | 6,547,133 B1 * | 4/2003 | DeVries et al. ............... 235/380 |
| 6,386,742 B1 | 5/2002 | DeLine et al. | | 6,549,253 B1 | 4/2003 | Robbie et al. |
| 6,390,529 B1 | 5/2002 | Bingle et al. | | 6,549,335 B1 | 4/2003 | Trapani et al. |
| 6,390,635 B2 | 5/2002 | Whitehead et al. | | 6,550,949 B1 | 4/2003 | Bauer et al. |
| 6,396,397 B1 | 5/2002 | Bos et al. | | 6,552,326 B2 | 4/2003 | Turnbull |
| 6,396,637 B2 | 5/2002 | Roest et al. | | 6,553,308 B1 * | 4/2003 | Uhlmann et al. ............. 701/208 |
| 6,407,468 B1 | 6/2002 | LeVesque et al. | | 6,559,902 B1 | 5/2003 | Kusuda et al. |
| 6,407,847 B1 | 6/2002 | Poll et al. | | 6,560,004 B2 | 5/2003 | Theiste et al. |
| 6,408,247 B1 | 6/2002 | Ichikawa et al. | | 6,560,027 B2 | 5/2003 | Meine |
| 6,411,204 B1 | 6/2002 | Bloomfield et al. | | 6,566,821 B2 | 5/2003 | Nakatsuka et al. |
| 6,412,959 B1 | 7/2002 | Tseng | | 6,567,060 B1 | 5/2003 | Sekiguchi |
| 6,412,973 B1 | 7/2002 | Bos et al. | | 6,567,708 B1 | 5/2003 | Bechtel et al. |
| 6,414,910 B1 | 7/2002 | Kaneko et al. | | 6,568,839 B1 | 5/2003 | Pastrick et al. |
| 6,415,230 B1 | 7/2002 | Maruko et al. | | 6,572,233 B1 | 6/2003 | Northman et al. |
| 6,416,208 B2 | 7/2002 | Pastrick et al. | | 6,573,957 B1 | 6/2003 | Suzuki |
| 6,417,786 B2 | 7/2002 | Learman et al. | | 6,573,963 B2 | 6/2003 | Ouderkirk et al. |
| 6,418,376 B1 | 7/2002 | Olson | | 6,575,643 B2 | 6/2003 | Takahashi |
| 6,419,300 B1 | 7/2002 | Pavao et al. | | 6,580,373 B1 | 6/2003 | Ohashi |
| 6,420,036 B1 | 7/2002 | Varaprasad et al. | | 6,580,479 B1 | 6/2003 | Sekiguchi et al. |
| 6,420,800 B1 | 7/2002 | LeVesque et al. | | 6,580,562 B2 | 6/2003 | Aoki et al. |
| 6,420,975 B1 | 7/2002 | DeLine et al. | | 6,581,007 B2 | 6/2003 | Hasegawa et al. |
| 6,421,081 B1 | 7/2002 | Markus | | 6,583,730 B2 | 6/2003 | Lang et al. |
| 6,424,272 B1 | 7/2002 | Gutta et al. | | 6,591,192 B2 | 7/2003 | Okamura et al. |
| 6,424,273 B1 | 7/2002 | Gutta et al. | | 6,592,230 B2 | 7/2003 | Dupay |
| 6,424,892 B1 | 7/2002 | Matsuoka | | 6,593,565 B2 | 7/2003 | Heslin et al. |
| 6,426,492 B1 | 7/2002 | Bos et al. | | 6,593,984 B2 | 7/2003 | Arakawa et al. |
| 6,426,568 B2 | 7/2002 | Turnbull et al. | | 6,594,065 B2 | 7/2003 | Byker et al. |
| 6,427,349 B1 | 8/2002 | Blank et al. | | 6,594,067 B2 | 7/2003 | Poll et al. |
| 6,428,172 B1 * | 8/2002 | Hutzel et al. .................. 359/838 | | 6,594,090 B2 | 7/2003 | Kruschwitz et al. |
| 6,433,676 B2 | 8/2002 | DeLine et al. | | 6,594,583 B2 | 7/2003 | Ogura et al. |
| 6,433,680 B1 | 8/2002 | Ho | | 6,594,614 B2 | 7/2003 | Studt et al. |
| 6,433,914 B1 | 8/2002 | Lomprey et al. | | 6,595,649 B2 | 7/2003 | Hoekstra et al. |
| 6,437,688 B1 | 8/2002 | Kobayashi | | 6,597,489 B1 | 7/2003 | Guarr et al. |
| 6,438,491 B1 | 8/2002 | Farmer | | 6,606,183 B2 | 8/2003 | Ikai et al. |
| 6,439,755 B1 | 8/2002 | Fant, Jr. et al. | | 6,611,202 B2 | 8/2003 | Schofield et al. |
| 6,441,872 B1 | 8/2002 | Ho | | 6,611,227 B1 | 8/2003 | Nebiyeloul-Kifle et al. |
| 6,441,943 B1 | 8/2002 | Roberts et al. | | 6,611,759 B2 | 8/2003 | Brosche |
| 6,441,963 B2 | 8/2002 | Murakami et al. | | 6,614,387 B1 | 9/2003 | Deadman |
| 6,441,964 B1 | 8/2002 | Chu et al. | | 6,614,579 B2 | 9/2003 | Roberts et al. |
| 6,445,287 B1 | 9/2002 | Schofield et al. | | 6,615,438 B1 | 9/2003 | Franco et al. |
| 6,447,128 B1 | 9/2002 | Lang et al. | | 6,616,313 B2 | 9/2003 | Fürst et al. |
| 6,449,082 B1 | 9/2002 | Agrawal et al. | | 6,616,764 B2 | 9/2003 | Krämer et al. |
| 6,452,533 B1 | 9/2002 | Yamabuchi et al. | | 6,618,672 B2 | 9/2003 | Sasaki et al. |
| 6,462,795 B1 | 10/2002 | Clarke | | 6,621,616 B1 | 9/2003 | Bauer et al. |
| 6,463,369 B2 | 10/2002 | Sadano et al. | | 6,624,936 B2 | 9/2003 | Kotchick et al. |
| 6,466,701 B1 | 10/2002 | Ejiri et al. | | 6,627,918 B2 | 9/2003 | Getz et al. |
| 6,471,362 B1 | 10/2002 | Carter et al. | | 6,630,888 B2 | 10/2003 | Lang et al. |
| 6,472,977 B1 | 10/2002 | Pöchmüller | | 6,636,190 B2 | 10/2003 | Hirakata et al. |
| 6,472,979 B2 | 10/2002 | Schofield et al. | | 6,636,258 B2 | 10/2003 | Strumolo |
| 6,473,001 B1 | 10/2002 | Blum | | 6,638,582 B1 | 10/2003 | Uchiyama et al. |
| 6,474,853 B2 | 11/2002 | Pastrick et al. | | 6,639,360 B2 | 10/2003 | Roberts et al. |
| 6,476,731 B1 | 11/2002 | Miki et al. | | 6,642,840 B2 | 11/2003 | Lang et al. |
| 6,477,460 B2 | 11/2002 | Kepler | | 6,642,851 B2 | 11/2003 | DeLine et al. |
| 6,477,464 B2 | 11/2002 | McCarthy et al. | | 6,646,697 B1 | 11/2003 | Sekiguchi et al. |
| 6,483,429 B1 | 11/2002 | Yasui et al. | | 6,648,477 B2 | 11/2003 | Hutzel et al. |
| 6,483,438 B2 | 11/2002 | DeLine et al. | | 6,650,457 B2 | 11/2003 | Busscher et al. |

| | | | | | | |
|---|---|---|---|---|---|---|
| 6,661,482 B2 | 12/2003 | Hara | | 6,834,969 B2 | 12/2004 | Bade et al. |
| 6,661,830 B1 | 12/2003 | Reed et al. | | 6,836,725 B2 | 12/2004 | Millington et al. |
| 6,665,592 B2 | 12/2003 | Kodama | | 6,842,276 B2 | 1/2005 | Poll et al. |
| 6,669,109 B2 | 12/2003 | Ivanov et al. | | 6,845,805 B1 | 1/2005 | Köster |
| 6,669,285 B1 | 12/2003 | Park et al. | | 6,846,098 B2 | 1/2005 | Bourdelais et al. |
| 6,670,207 B1 | 12/2003 | Roberts | | 6,847,424 B2 | 1/2005 | Gotoh et al. |
| 6,670,910 B2 | 12/2003 | Delcheccolo et al. | | 6,847,487 B2 | 1/2005 | Burgner |
| 6,670,941 B2 | 12/2003 | Albu et al. | | 6,848,817 B2 | 2/2005 | Bos et al. |
| 6,671,080 B2 | 12/2003 | Poll et al. | | 6,849,165 B2 | 2/2005 | Klöppel et al. |
| 6,672,731 B2 | 1/2004 | Schnell et al. | | 6,853,491 B1 | 2/2005 | Ruhle et al. |
| 6,672,734 B2 | 1/2004 | Lammers | | 6,870,655 B1 | 3/2005 | Northman et al. |
| 6,672,744 B2 | 1/2004 | DeLine et al. | | 6,870,656 B2 | 3/2005 | Tonar et al. |
| 6,672,745 B1 | 1/2004 | Bauer et al. | | 6,871,982 B2 | 3/2005 | Holman et al. |
| 6,674,370 B2 | 1/2004 | Rodewald et al. | | 6,877,888 B2 | 4/2005 | DeLine et al. |
| 6,675,075 B1 | 1/2004 | Engelsburg et al. | | 6,882,287 B2 | 4/2005 | Schofield |
| 6,678,083 B1 | 1/2004 | Anstee | | 6,889,064 B2 | 5/2005 | Baratono et al. |
| 6,678,614 B2 * | 1/2004 | McCarthy et al. ............ 701/213 | | 6,891,563 B2 | 5/2005 | Schofield et al. |
| 6,679,608 B2 | 1/2004 | Bechtel et al. | | 6,902,284 B2 | 6/2005 | Hutzel et al. |
| 6,683,539 B2 | 1/2004 | Trajkovic et al. | | 6,904,348 B2 | 6/2005 | Drummond et al. |
| 6,683,969 B1 | 1/2004 | Nishigaki et al. | | 6,906,632 B2 | 6/2005 | DeLine et al. |
| 6,685,348 B2 | 2/2004 | Pastrick et al. | | 6,910,779 B2 | 6/2005 | Abel et al. |
| 6,690,262 B1 | 2/2004 | Winnett | | 6,912,396 B2 | 6/2005 | Sziraki et al. |
| 6,690,268 B2 * | 2/2004 | Schofield et al. ............ 340/438 | | 6,916,099 B2 | 7/2005 | Su et al. |
| 6,690,413 B1 | 2/2004 | Moore | | 6,922,902 B2 | 8/2005 | Schierbeek et al. |
| 6,690,438 B2 | 2/2004 | Sekiguchi | | 6,928,180 B2 | 8/2005 | Stam et al. |
| 6,693,517 B2 * | 2/2004 | McCarthy et al. ......... 340/425.5 | | 6,928,366 B2 | 8/2005 | Ockerse et al. |
| 6,693,518 B2 | 2/2004 | Kumata et al. | | 6,930,737 B2 | 8/2005 | Weindorf et al. |
| 6,693,519 B2 | 2/2004 | Keirstead | | 6,934,067 B2 | 8/2005 | Ash et al. |
| 6,693,524 B1 | 2/2004 | Payne | | 6,946,978 B2 | 9/2005 | Schofield |
| 6,700,692 B2 | 3/2004 | Tonar et al. | | 6,947,576 B2 | 9/2005 | Stam et al. |
| 6,709,136 B2 | 3/2004 | Pastrick et al. | | 6,947,577 B2 | 9/2005 | Stam et al. |
| 6,713,783 B1 | 3/2004 | Mase et al. | | 6,951,410 B2 | 10/2005 | Parsons |
| 6,717,109 B1 | 4/2004 | Macher et al. | | 6,951,681 B2 | 10/2005 | Hartley et al. |
| 6,717,610 B1 | 4/2004 | Bos et al. | | 6,952,312 B2 | 10/2005 | Weber et al. |
| 6,717,712 B2 | 4/2004 | Lynam et al. | | 6,958,495 B2 | 10/2005 | Nishijima et al. |
| 6,719,215 B2 | 4/2004 | Droulliard | | 6,958,683 B2 | 10/2005 | Mills et al. |
| 6,724,446 B2 | 4/2004 | Motomura et al. | | 6,961,178 B2 | 11/2005 | Sugino et al. |
| 6,726,337 B2 | 4/2004 | Whitehead et al. | | 6,963,438 B2 | 11/2005 | Busscher et al. |
| 6,727,807 B2 | 4/2004 | Trajkovic et al. | | 6,968,273 B2 | 11/2005 | Ockerse et al. |
| 6,727,808 B1 | 4/2004 | Uselmann et al. | | 6,972,888 B2 | 12/2005 | Poll et al. |
| 6,727,844 B1 | 4/2004 | Zimmermann et al. | | 6,974,236 B2 | 12/2005 | Tenmyo |
| 6,731,332 B1 | 5/2004 | Yasui et al. | | 6,975,215 B2 | 12/2005 | Schofield et al. |
| 6,734,807 B2 | 5/2004 | King | | 6,977,702 B2 | 12/2005 | Wu |
| 6,736,526 B2 | 5/2004 | Matsuba et al. | | 6,980,092 B2 | 12/2005 | Turnbull et al. |
| 6,737,629 B2 | 5/2004 | Nixon et al. | | 6,985,291 B2 | 1/2006 | Watson et al. |
| 6,737,630 B2 | 5/2004 | Turnbull | | 6,992,718 B1 | 1/2006 | Takahara |
| 6,737,964 B2 | 5/2004 | Samman et al. | | 7,001,058 B2 | 2/2006 | Inditsky |
| 6,738,088 B1 | 5/2004 | Uskolovsky et al. | | 7,004,592 B2 | 2/2006 | Varaprasad et al. |
| 6,742,904 B2 | 6/2004 | Bechtel et al. | | 7,004,593 B2 | 2/2006 | Weller et al. |
| 6,744,353 B2 | 6/2004 | Sjönell | | 7,006,173 B1 | 2/2006 | Hiyama et al. |
| 6,746,775 B1 | 6/2004 | Boire et al. | | 7,009,751 B2 | 3/2006 | Tonar et al. |
| 6,747,716 B2 | 6/2004 | Kuroiwa et al. | | 7,012,543 B2 | 3/2006 | DeLine et al. |
| 6,748,211 B1 | 6/2004 | Isaac et al. | | 7,038,577 B2 | 5/2006 | Pawlicki et al. |
| 6,749,308 B1 | 6/2004 | Niendorf et al. | | 7,041,965 B2 | 5/2006 | Heslin et al. |
| 6,755,542 B2 | 6/2004 | Bechtel et al. | | 7,042,616 B2 | 5/2006 | Tonar et al. |
| 6,756,912 B2 | 6/2004 | Skiver et al. | | 7,046,418 B2 | 5/2006 | Lin et al. |
| 6,757,109 B2 | 6/2004 | Bos | | 7,046,448 B2 | 5/2006 | Burgner |
| D493,131 S | 7/2004 | Lawlor et al. | | 7,050,908 B1 | 5/2006 | Schwartz et al. |
| D493,394 S | 7/2004 | Lawlor et al. | | 7,057,681 B2 | 6/2006 | Hinata et al. |
| 6,759,113 B1 | 7/2004 | Tang | | 7,063,893 B2 | 6/2006 | Hoffman |
| 6,759,945 B2 | 7/2004 | Richard | | 7,064,882 B2 | 6/2006 | Tonar et al. |
| 6,760,157 B1 | 7/2004 | Allen et al. | | 7,074,486 B2 | 7/2006 | Boire et al. |
| 6,773,116 B2 | 8/2004 | De Vaan et al. | | 7,081,810 B2 | 7/2006 | Henderson et al. |
| 6,774,356 B2 | 8/2004 | Heslin et al. | | 7,092,052 B2 | 8/2006 | Okamoto et al. |
| 6,774,810 B2 | 8/2004 | DeLine et al. | | 7,095,567 B2 | 8/2006 | Troxell et al. |
| 6,778,904 B2 | 8/2004 | Iwami et al. | | 7,106,213 B2 | 9/2006 | White |
| 6,779,900 B1 | 8/2004 | Nolan-Brown | | 7,106,392 B2 | 9/2006 | You |
| 6,784,129 B2 | 8/2004 | Seto et al. | | 7,108,409 B2 | 9/2006 | DeLine et al. |
| 6,797,396 B1 | 9/2004 | Liu et al. | | 7,121,028 B2 | 10/2006 | Shoen et al. |
| 6,800,871 B2 | 10/2004 | Matsuda et al. | | 7,125,131 B2 | 10/2006 | Olczak |
| 6,801,283 B2 | 10/2004 | Koyama et al. | | 7,130,727 B2 | 10/2006 | Liu et al. |
| 6,805,474 B2 | 10/2004 | Walser et al. | | 7,132,064 B2 | 11/2006 | Li et al. |
| 6,806,452 B2 | 10/2004 | Bos et al. | | 7,136,091 B2 | 11/2006 | Ichikawa et al. |
| 6,810,323 B1 | 10/2004 | Bullock et al. | | 7,138,974 B2 | 11/2006 | Hirakata et al. |
| 6,812,907 B1 | 11/2004 | Gennetten et al. | | 7,149,613 B2 | 12/2006 | Stam et al. |
| 6,819,231 B2 | 11/2004 | Berberich et al. | | 7,151,515 B2 | 12/2006 | Kim et al. |
| 6,824,281 B2 | 11/2004 | Schofield et al. | | 7,151,997 B2 | 12/2006 | Uhlmann et al. |
| 6,831,268 B2 | 12/2004 | Bechtel et al. | | 7,153,588 B2 | 12/2006 | McMan et al. |
| 6,832,848 B2 | 12/2004 | Pastrick | | 7,154,657 B2 | 12/2006 | Poll et al. |

| | | |
|---|---|---|
| 7,158,881 B2 | 1/2007 | McCarthy et al. |
| 7,160,017 B2 | 1/2007 | Lee et al. |
| 7,167,796 B2 | 1/2007 | Taylor et al. |
| 7,168,830 B2 | 1/2007 | Pastrick et al. |
| 7,175,291 B1 | 2/2007 | Li |
| 7,176,790 B2 | 2/2007 | Yamazaki |
| 7,184,190 B2 | 2/2007 | McCabe et al. |
| 7,187,498 B2 | 3/2007 | Bengoechea et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,206,697 B2 | 4/2007 | Olney et al. |
| 7,209,277 B2 | 4/2007 | Tonar et al. |
| 7,215,473 B2 | 5/2007 | Fleming |
| 7,221,363 B2 | 5/2007 | Roberts et al. |
| 7,224,324 B2 | 5/2007 | Quist et al. |
| 7,227,472 B1 | 6/2007 | Roe |
| 7,230,523 B2 | 6/2007 | Harter, Jr. et al. |
| 7,232,231 B2 | 6/2007 | Shih |
| 7,233,304 B1 | 6/2007 | Aratani et al. |
| 7,235,918 B2 | 6/2007 | McCullough et al. |
| 7,241,037 B2 | 7/2007 | Mathieu et al. |
| 7,245,207 B1 | 7/2007 | Dayan et al. |
| 7,245,231 B2 | 7/2007 | Kiefer et al. |
| 7,245,336 B2 | 7/2007 | Hiyama et al. |
| 7,248,305 B2 | 7/2007 | Ootsuta et al. |
| 7,251,079 B2 | 7/2007 | Capaldo et al. |
| 7,255,451 B2 | 8/2007 | McCabe et al. |
| 7,255,465 B2 | 8/2007 | DeLine et al. |
| 7,259,036 B2 | 8/2007 | Borland et al. |
| 7,262,406 B2 | 8/2007 | Heslin et al. |
| 7,262,916 B2 | 8/2007 | Kao et al. |
| 7,265,342 B2 | 9/2007 | Heslin et al. |
| 7,268,841 B2 | 9/2007 | Kasajima et al. |
| 7,269,327 B2 | 9/2007 | Tang |
| 7,269,328 B2 | 9/2007 | Tang |
| 7,271,951 B2 | 9/2007 | Weber et al. |
| 7,274,501 B2 | 9/2007 | McCabe et al. |
| 7,281,491 B2 | 10/2007 | Iwamaru |
| 7,286,280 B2 | 10/2007 | Whitehead et al. |
| 7,287,868 B2 | 10/2007 | Carter et al. |
| 7,289,037 B2 | 10/2007 | Uken et al. |
| 7,290,919 B2 | 11/2007 | Pan et al. |
| 7,292,208 B1 | 11/2007 | Park et al. |
| 7,302,344 B2 | 11/2007 | Olney et al. |
| 7,308,341 B2 | 12/2007 | Schofield et al. |
| 7,310,177 B2 | 12/2007 | McCabe et al. |
| 7,311,428 B2 | 12/2007 | DeLine et al. |
| 7,316,485 B2 | 1/2008 | Roose |
| 7,317,386 B2 | 1/2008 | Lengning et al. |
| 7,323,819 B2 | 1/2008 | Hong et al. |
| 7,324,043 B2 | 1/2008 | Purden et al. |
| 7,324,261 B2 | 1/2008 | Tonar et al. |
| 7,327,225 B2 | 2/2008 | Nicholas et al. |
| 7,327,226 B2 | 2/2008 | Turnbull et al. |
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,344,284 B2 | 3/2008 | Lynam et al. |
| 7,349,143 B2 | 3/2008 | Tonar et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,389,171 B2 | 6/2008 | Rupp |
| 7,391,563 B2 | 6/2008 | McCabe et al. |
| 7,396,147 B2 | 7/2008 | Munro |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,446,462 B2 | 11/2008 | Lim et al. |
| 7,446,650 B2 | 11/2008 | Scholfield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,947 B2 | 6/2009 | Varaprasad et al. |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,893 B2 | 9/2009 | Rottcher |
| 7,600,878 B2 | 10/2009 | Blank et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |

| | | |
|---|---|---|
| 7,711,479 B2 | 5/2010 | Taylor et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,734,392 B2 | 6/2010 | Schofield et al. |
| 7,746,534 B2 | 6/2010 | Tonar et al. |
| 7,787,077 B2 | 8/2010 | Kondoh et al. |
| 7,791,694 B2 | 9/2010 | Molsen et al. |
| 7,830,583 B2 | 11/2010 | Neuman et al. |
| 7,842,154 B2 | 11/2010 | Lynam |
| 2001/0019356 A1 | 9/2001 | Takeda et al. |
| 2001/0022616 A1 | 9/2001 | Rademacher et al. |
| 2001/0026215 A1 | 10/2001 | Nakaho et al. |
| 2001/0026316 A1 | 10/2001 | Senatore |
| 2001/0030857 A1 | 10/2001 | Futhey et al. |
| 2001/0045981 A1 | 11/2001 | Gloger et al. |
| 2002/0036828 A1 | 3/2002 | Wong |
| 2002/0044065 A1 | 4/2002 | Quist et al. |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |
| 2002/0149727 A1 | 10/2002 | Wang |
| 2002/0154007 A1 | 10/2002 | Yang |
| 2002/0196639 A1 | 12/2002 | Weidel |
| 2003/0002165 A1 | 1/2003 | Mathias et al. |
| 2003/0002179 A1 | 1/2003 | Roberts et al. |
| 2003/0007261 A1 | 1/2003 | Hutzel et al. |
| 2003/0016287 A1 | 1/2003 | Nakayama et al. |
| 2003/0016542 A1 | 1/2003 | Pastrick et al. |
| 2003/0025596 A1 | 2/2003 | Lang et al. |
| 2003/0030546 A1 | 2/2003 | Tseng |
| 2003/0030724 A1 | 2/2003 | Okamoto |
| 2003/0035050 A1 | 2/2003 | Mizusawa et al. |
| 2003/0043269 A1 | 3/2003 | Park |
| 2003/0043589 A1 | 3/2003 | Blank |
| 2003/0048639 A1 | 3/2003 | Boyd et al. |
| 2003/0052969 A1 | 3/2003 | Satoh et al. |
| 2003/0058338 A1 | 3/2003 | Kawauchi et al. |
| 2003/0069690 A1 | 4/2003 | Correia et al. |
| 2003/0080877 A1 | 5/2003 | Takagi et al. |
| 2003/0088361 A1 | 5/2003 | Sekiguchi |
| 2003/0090568 A1 | 5/2003 | Pico |
| 2003/0090569 A1 | 5/2003 | Poechmueller |
| 2003/0090570 A1 | 5/2003 | Takagi et al. |
| 2003/0095331 A1 | 5/2003 | Bengoechea et al. |
| 2003/0098908 A1 | 5/2003 | Misaiji et al. |
| 2003/0101749 A1 | 6/2003 | Lingle et al. |
| 2003/0103142 A1 | 6/2003 | Hitomi et al. |
| 2003/0117522 A1 | 6/2003 | Okada |
| 2003/0122929 A1 | 7/2003 | Minuado et al. |
| 2003/0133014 A1 | 7/2003 | Mendoza |
| 2003/0137586 A1 | 7/2003 | Lewellen |
| 2003/0141965 A1 | 7/2003 | Gunderson et al. |
| 2003/0146831 A1 | 8/2003 | Berberich et al. |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0214576 A1 | 11/2003 | Koga |
| 2003/0214584 A1 | 11/2003 | Ross, Jr. |
| 2003/0214733 A1 | 11/2003 | Fujikawa et al. |
| 2003/0222793 A1 | 12/2003 | Tanaka et al. |
| 2003/0222983 A1 | 12/2003 | Nobori et al. |
| 2003/0227546 A1 | 12/2003 | Hilborn et al. |
| 2004/0004541 A1 | 1/2004 | Hong |
| 2004/0027695 A1 | 2/2004 | Lin |
| 2004/0032321 A1 | 2/2004 | McMahon et al. |
| 2004/0032655 A1 | 2/2004 | Kikuchi et al. |
| 2004/0032676 A1 | 2/2004 | Drummond et al. |
| 2004/0036768 A1 | 2/2004 | Green |
| 2004/0046870 A1 | 3/2004 | Leigh Travis |
| 2004/0051634 A1 | 3/2004 | Schofield et al. |
| 2004/0056955 A1 | 3/2004 | Berberich et al. |
| 2004/0057131 A1 | 3/2004 | Hutzel et al. |
| 2004/0064241 A1 | 4/2004 | Sekiguchi |
| 2004/0066285 A1 | 4/2004 | Sekiguchi |
| 2004/0075603 A1 | 4/2004 | Kodama |
| 2004/0077359 A1 | 4/2004 | Bernas et al. |
| 2004/0080404 A1 | 4/2004 | White |
| 2004/0085196 A1 | 5/2004 | Miller et al. |
| 2004/0085499 A1 | 5/2004 | Baek |
| 2004/0090314 A1 | 5/2004 | Iwamoto |
| 2004/0090317 A1 | 5/2004 | Rothkop |
| 2004/0096082 A1 | 5/2004 | Nakai et al. |
| 2004/0098196 A1 | 5/2004 | Sekiguchi |
| 2004/0105614 A1 | 6/2004 | Kobayashi et al. |
| 2004/0107030 A1 | 6/2004 | Nishira et al. |
| 2004/0109060 A1 | 6/2004 | Ishii |
| 2004/0114039 A1 | 6/2004 | Ishikura |
| 2004/0170008 A1 | 9/2004 | Tenmyo |
| 2004/0202001 A1 | 10/2004 | Roberts et al. |
| 2004/0243303 A1 | 12/2004 | Padmanabhan |
| 2004/0264011 A1 | 12/2004 | Lynam |
| 2005/0024591 A1 | 2/2005 | Lian et al. |
| 2005/0024729 A1 | 2/2005 | Ockerse et al. |
| 2005/0078389 A1 | 4/2005 | Kulas et al. |
| 2005/0079326 A1 | 4/2005 | Varaprasad et al. |
| 2005/0099559 A1 | 5/2005 | Lee et al. |
| 2005/0099693 A1 | 5/2005 | Schofield et al. |
| 2005/0111070 A1 | 5/2005 | Lin et al. |
| 2005/0117095 A1 | 6/2005 | Ma |
| 2005/0134983 A1 | 6/2005 | Lynam |
| 2005/0140855 A1 | 6/2005 | Utsumi et al. |
| 2005/0168995 A1 | 8/2005 | Kittlemann et al. |
| 2005/0169003 A1 | 8/2005 | Lindahl et al. |
| 2005/0172504 A1 | 8/2005 | Ohm et al. |
| 2005/0237440 A1 | 10/2005 | Sugimura et al. |
| 2005/0270766 A1 | 12/2005 | Kung et al. |
| 2006/0001641 A1 | 1/2006 | Degwekar et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0164230 A1 | 7/2006 | DeWind et al. |
| 2006/0171704 A1 | 8/2006 | Bingle et al. |
| 2006/0274218 A1 | 12/2006 | Xue |
| 2007/0041096 A1 | 2/2007 | Nieuwkerk et al. |
| 2007/0058257 A1 | 3/2007 | Lynam |
| 2007/0064108 A1 | 3/2007 | Haler |
| 2007/0080585 A1 | 4/2007 | Lyu |
| 2007/0118287 A1 | 5/2007 | Taylor et al. |
| 2007/0183037 A1 | 8/2007 | De Boer et al. |
| 2007/0183066 A1 | 8/2007 | Varaprasad et al. |
| 2007/0184284 A1 | 8/2007 | Varaprasad et al. |
| 2007/0201122 A1 | 8/2007 | Dozeman et al. |
| 2007/0262732 A1 | 11/2007 | Shen |
| 2008/0002106 A1 | 1/2008 | Van De Witte et al. |
| 2008/0030311 A1 | 2/2008 | Dayan et al. |
| 2008/0068520 A1 | 3/2008 | Minikey, Jr. et al. |
| 2008/0077882 A1 | 3/2008 | Kramer et al. |
| 2008/0094685 A1 | 4/2008 | Varaprasad et al. |
| 2008/0180529 A1 | 7/2008 | Taylor et al. |
| 2008/0180781 A1 | 7/2008 | Varaprasad et al. |
| 2008/0212189 A1 | 9/2008 | Baur et al. |
| 2008/0225538 A1 | 9/2008 | Lynam et al. |
| 2008/0231704 A1 | 9/2008 | Schofield et al. |
| 2008/0266389 A1 | 10/2008 | DeWind et al. |
| 2008/0291522 A1 | 11/2008 | Varaprasad et al. |
| 2009/0002491 A1 | 1/2009 | Haler |
| 2009/0015736 A1 | 1/2009 | Weller et al. |
| 2009/0033837 A1 | 2/2009 | Molsen et al. |
| 2009/0040465 A1 | 2/2009 | Conner et al. |
| 2009/0040588 A1 | 2/2009 | Tonar et al. |
| 2009/0040778 A1 | 2/2009 | Takayanagi et al. |
| 2009/0052003 A1 | 2/2009 | Schofield et al. |
| 2009/0067032 A1 | 3/2009 | Varaprasad et al. |
| 2009/0080055 A1 | 3/2009 | Baur et al. |
| 2009/0085729 A1 | 4/2009 | Nakamura et al. |
| 2009/0096937 A1 | 4/2009 | Bauer et al. |
| 2009/0141331 A1 | 6/2009 | Skiver et al. |
| 2009/0174776 A1 | 7/2009 | Taylor et al. |
| 2009/0184904 A1 | 7/2009 | S. et al. |
| 2009/0201137 A1 | 8/2009 | Weller et al. |
| 2009/0219394 A1 | 9/2009 | Heslin et al. |
| 2009/0231741 A1 | 9/2009 | Weller et al. |

| | | | | | | |
|---|---|---|---|---|---|---|
| 2009/0237820 | A1 | 9/2009 | McCabe et al. | GB | 1553376 | 9/1979 |
| 2009/0243824 | A1 | 10/2009 | Hook et al. | GB | 2137573 A | 10/1984 |
| 2009/0244740 | A1 | 10/2009 | Takayanagi et al. | GB | 2161440 | 1/1986 |
| 2009/0262192 | A1 | 10/2009 | Schofield et al. | GB | 2192370 | 1/1988 |
| 2009/0262422 | A1 | 10/2009 | Cross et al. | GB | 2222991 | 3/1990 |
| 2009/0290369 | A1 | 11/2009 | Schofield et al. | GB | 2255539 A | 11/1992 |
| 2009/0296190 | A1 | 12/2009 | Anderson et al. | GB | 2351055 A | 12/2000 |
| 2010/0033797 | A1 | 2/2010 | Schofield et al. | GB | 2362494 | 11/2001 |
| 2010/0045790 | A1 | 2/2010 | Lynam et al. | JP | 50-000638 A | 1/1975 |
| 2010/0045899 | A1 | 2/2010 | Ockerse | JP | 52-146988 | 11/1977 |
| 2010/0046059 | A1 | 2/2010 | McCabe et al. | JP | 55-039843 | 3/1980 |
| 2010/0053723 | A1 | 3/2010 | Varaprasad et al. | JP | 57-30639 | 2/1982 |
| 2010/0085645 | A1 | 4/2010 | Skiver et al. | JP | 57-208530 | 12/1982 |
| 2010/0091509 | A1 | 4/2010 | DeLine et al. | JP | 58-030729 | 2/1983 |
| 2010/0110523 | A1 | 5/2010 | Varaprasad et al. | JP | 58-110334 | 6/1983 |
| 2010/0110553 | A1 | 5/2010 | Anderson et al. | JP | 58-180347 | 10/1983 |
| 2010/0117815 | A1 | 5/2010 | Deline et al. | JP | 58-209635 | 12/1983 |
| 2010/0126030 | A1 | 5/2010 | Weller et al. | JP | 59-114139 | 7/1984 |
| 2010/0165437 | A1 | 7/2010 | Tonar et al. | JP | 60-212730 | 10/1985 |
| 2010/0172008 | A1 | 7/2010 | McCabe et al. | JP | 60-261275 | 12/1985 |
| 2010/0174485 | A1 | 7/2010 | Taylor et al. | JP | 61-260217 | 11/1986 |
| 2010/0194890 | A1 | 8/2010 | Weller et al. | JP | 62-043543 | 2/1987 |
| 2010/0195226 | A1 | 8/2010 | Heslin et al. | JP | 62-075619 | 4/1987 |
| 2010/0201896 | A1 | 8/2010 | Ostreko et al. | JP | 62-122487 | 6/1987 |
| 2010/0202075 | A1 | 8/2010 | Blank et al. | JP | 63-02753 | 1/1988 |
| 2010/0207013 | A1 | 8/2010 | Drummond et al. | JP | 63-106730 | 5/1988 |
| 2010/0214662 | A1 | 8/2010 | Takayanagi et al. | JP | 63-106731 | 5/1988 |
| 2010/0219985 | A1 | 9/2010 | Schofield et al. | JP | 63-274286 | 11/1988 |
| 2010/0222963 | A1 | 9/2010 | Schofield et al. | JP | 64-14700 | 1/1989 |
| 2010/0245701 | A1 | 9/2010 | Sato et al. | JP | 01-123587 | 5/1989 |
| 2010/0246017 | A1 | 9/2010 | Tonar et al. | JP | 02-122844 | 10/1990 |
| 2010/0277786 | A1 | 11/2010 | Anderson et al. | JP | 03-28947 | 3/1991 |
| | | | | JP | 03-052097 | 3/1991 |
| | FOREIGN PATENT DOCUMENTS | | | JP | 30-061192 | 3/1991 |
| AU | A-40317/95 | | 2/1995 | JP | 03-110855 | 5/1991 |
| CN | 1189224 | | 7/1998 | JP | 03-243914 | 10/1991 |
| DE | 941408 | | 4/1956 | JP | 04-114587 | 4/1992 |
| DE | 944531 | | 7/1956 | JP | 04-245886 | 9/1992 |
| DE | 7323996 | | 11/1973 | JP | 05-213113 | 8/1993 |
| DE | 3248511 | A1 | 7/1984 | JP | 05-257142 | 10/1993 |
| DE | 3301945 | | 7/1984 | JP | 60-80953 A | 3/1994 |
| DE | 3614882 | | 11/1987 | JP | 61-07035 A | 4/1994 |
| DE | 9306989.8 | U1 | 7/1993 | JP | 62-27318 A | 8/1994 |
| DE | 4329983 | | 8/1995 | JP | 07-175035 | 7/1995 |
| DE | 4444443 | A1 | 6/1996 | JP | 07-266928 | 10/1995 |
| DE | 29703084 | U1 | 6/1997 | JP | 07-277072 | 10/1995 |
| DE | 29805142 | U1 | 5/1998 | JP | 07-281185 | 10/1995 |
| DE | 19741896 | | 4/1999 | JP | 08-008083 | 1/1996 |
| DE | 19755008 | | 7/1999 | JP | 08-083581 | 3/1996 |
| DE | 29902344 | U1 | 7/1999 | JP | 08-216789 | 8/1996 |
| DE | 19934999 | | 2/2001 | JP | 09-260074 | 3/1997 |
| DE | 19943355 | | 3/2001 | JP | 05-077657 | 7/1997 |
| DE | 20118868 | | 3/2002 | JP | 09-220976 | 8/1997 |
| DE | 10131459 | | 1/2003 | JP | 09-266078 | 10/1997 |
| EP | 0299509 | A2 | 1/1989 | JP | 09-288262 | 11/1997 |
| EP | 0513476 | A1 | 11/1992 | JP | 10-076880 | 3/1998 |
| EP | 0524766 | | 1/1993 | JP | 10-199480 | 7/1998 |
| EP | 0729864 | A1 | 12/1995 | JP | 10-206643 | 8/1998 |
| EP | 0728618 | A2 | 8/1996 | JP | 11-038381 | 2/1999 |
| EP | 0825477 | | 2/1998 | JP | 11-067485 | 3/1999 |
| EP | 0830985 | | 3/1998 | JP | 11-078693 | 3/1999 |
| EP | 0928723 | A2 | 7/1999 | JP | 11-109337 | 4/1999 |
| EP | 937601 | A2 | 8/1999 | JP | 11-160539 | 6/1999 |
| EP | 1075986 | | 2/2001 | JP | 11-212073 | 8/1999 |
| EP | 1097848 | A | 5/2001 | JP | 11-283759 | 10/1999 |
| EP | 1152285 | A2 | 11/2001 | JP | 11-298058 | 10/1999 |
| EP | 1256833 | | 11/2002 | JP | 11-305197 | 11/1999 |
| EP | 0899157 | | 10/2004 | JP | 2000-131681 | 5/2000 |
| EP | 1315639 | | 2/2006 | JP | 2000-153736 | 6/2000 |
| FR | 1021987 | A | 2/1953 | JP | 2000-159014 | 6/2000 |
| FR | 1461419 | | 12/1966 | JP | 2000-255321 | 9/2000 |
| FR | 2585991 | | 2/1987 | JP | 2000-330107 | 11/2000 |
| FR | 2672857 | A1 | 8/1992 | JP | 2001-083509 | 3/2001 |
| FR | 2673499 | A1 | 9/1992 | JP | 2001-222005 | 8/2001 |
| FR | 2759045 | | 8/1998 | JP | 2002-120649 | 4/2002 |
| GB | 810010 | | 3/1959 | JP | 2002-122860 | 4/2002 |
| GB | 934037 | | 8/1963 | JP | 2002-352611 | 12/2002 |
| GB | 1008411 | | 10/1965 | JP | 2003-267129 | 9/2003 |
| GB | 1136134 | | 12/1968 | JP | 2004-182156 | 7/2004 |

| | | |
|---|---|---|
| JP | 2005-148119 | 6/2005 |
| JP | 2005-327600 | 11/2005 |
| JP | 38-46073 | 11/2006 |
| WO | WO 82/02448 | 7/1982 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

Edgar, Julian; Goodbye 12 Volts . . . Hello 42 Volts!; Oct. 5, 1999; Autospeed 50; Issue 50; www.autospeed.co.nz/cms/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publising Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, article, 4 pages Prentice-Hall, Englewood Cliffs, New Jersey, believed to be published more than one year prior to the filing date of the present application.

G. Wang, D. Renshaw, P.B. Denyer and M. Lu, CMOS Video Cameras, article, 1991, 4 pages, University of Edinburgh, UK.

* cited by examiner

*Primary Examiner* — Gertrude Arthur Jeanglaud

(74) *Attorney, Agent, or Firm* — Gardner, Linn, Burkhart & Flory, LLP

(57) ABSTRACT

A vehicular wireless communication system includes a control in a vehicle operable to communicate with an external service provider via a wireless communication link between the equipped vehicle and the external service provider. The control may receive a user input and responsive thereto, may establish the wireless communication link between the equipped vehicle and the external service provider. Data from the external service provider is downloaded to the control via the wireless communication link. The control controls at least one accessory of the vehicle, and the control may control the accessory responsive to at least one of (a) a geographic location of the vehicle as determined by a global positioning system of the equipped vehicle and (b) a biometric characteristic of an occupant of the equipped vehicle.

39 Claims, 2 Drawing Sheets

VEHICULAR WIRELESS COMMUNICATION SYSTEM

CROSS REFERENCE TO RELATED APPLICATIONS

The present application is a continuation of U.S. patent application Ser. No. 12/724,895, filed Mar. 16, 2010, now U.S. Pat. No. 7,822,543, which is a continuation of U.S. patent application Ser. No. 12/405,614, filed Mar. 17, 2009, now U.S. Pat. No. 7,711,479, which is a continuation of U.S. patent application Ser. No. 11/935,800, filed Nov. 6, 2007, now U.S. Pat. No. 7,571,042, which is a continuation of U.S. patent application Ser. No. 11/624,381, filed Jan. 18, 2007, now U.S. Pat. No. 7,490,007, which is a continuation of U.S. patent application Ser. No. 10/645,762, filed Aug. 20, 2003, now U.S. Pat. No. 7,167,796, which claims priority of U.S. provisional applications, Ser. No. 60/406,166, filed Aug. 27, 2002; Ser. No. 60/405,392, filed Aug. 23, 2002; and Ser. No. 60/404,906, filed Aug. 21, 2002, and U.S. patent application Ser. No. 10/645,762 is a continuation-in-part of U.S. patent application Ser. No. 10/456,599, filed Jun. 6, 2003, now U.S. Pat. No. 7,004,593, and U.S. patent application Ser. No. 10/645,762 is a continuation-in-part of U.S. patent application Ser. No. 10/287,178, filed Nov. 4, 2002, now U.S. Pat. No. 6,678,614, which is a continuation of U.S. patent application Ser. No. 09/799,414, filed Mar. 5, 2001, now U.S. Pat. No. 6,477,464, which claims priority of U.S. provisional application Ser. No. 60/187,960, filed Mar. 9, 2000, all of which are hereby incorporated herein by reference in their entireties, and U.S. patent application Ser. No. 11/624,381 is a continuation-in-part of U.S. patent application Ser. No. 10/755,915, filed Jan. 13, 2004, now U.S. Pat. No. 7,446,650, which is a continuation of U.S. patent application Ser. No. 09/793,002, filed Feb. 26, 2001, now U.S. Pat. No. 6,690,268, which claims benefit of U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Sep. 21, 2000; Ser. No. 60/218,336, filed Jul. 14, 2000; and Ser. No. 60/186,520, filed Mar. 2, 2000, and U.S. patent application Ser. No. 11/624,381 is a continuation-in-part of U.S. patent application Ser. No. 10/054,633, filed Jan. 22, 2002, now U.S. Pat. No. 7,195,381, which claims priority from and incorporates by reference in their entireties U.S. provisional applications, Ser. No. 60/346,733, filed Jan. 7, 2002; Ser. No. 60/263,680, filed Jan. 23, 2001; Ser. No. 60/271,466, filed Feb. 26, 2001; and Ser. No. 60/315,384, filed Aug. 28, 2001, and which is a continuation-in-part of U.S. patent application Ser. No. 09/793,002, filed Feb. 26, 2001, now U.S. Pat. No. 6,690,268.

FIELD OF THE INVENTION

The present invention relates generally to telematics systems for vehicles and, more particularly, to telematics systems which may provide driving instructions or directions to a driver of a vehicle or which may provide other controls to an accessory or system of the vehicle. The present invention also relates generally to vehicle seating adjustment systems and, more particularly, to vehicle seating adjustment systems with memory adjustment.

BACKGROUND OF THE INVENTION

In-vehicle telematics systems or vehicle-based telematics systems, such as General Motor's ONSTAR®, Daimler's TELEAID™, Ford's RESCU® or the like, are common in vehicles today. Such telematics systems involve a telecommunication link from the vehicle to an operator or a voice input system at a service center or the like external to the vehicle. The driver of the vehicle may connect or communicate with an operator at the service center to request directions to a targeted location. The service center may provide directions to the targeted location based on the known position of the vehicle, which may be given to the service center operator by the driver, or which may be known by the operator via a link to a global positioning system (GPS) of the vehicle.

However, in such concierge-type systems, typically all of the road names, exits to take, and directional headings/directions are given verbally by the service center operator to the driver all together while the driver is driving the vehicle. The driver is then typically expected to remember several directional driving instructions and often has difficulty in remembering the full directions. Although the driver may optionally remain on the line with the service center operator until the driver reaches the intended destination, which may take many minutes, such as ten, fifteen, twenty minutes or more, and/or the driver may call back to the service center for updated directions, these actions increase the cost of the service, since the service center typically charges for such calls.

Therefore, there is a need in the art for a navigation system that overcomes the shortcomings of the prior art.

SUMMARY OF THE INVENTION

The present invention is intended to provide instructions or directions to a driver of a vehicle which are keyed or coded or linked to respective geographic locations, such that the particular instructions are provided in response to the geographic position of the vehicle at least generally corresponding to the particular geographic location associated with the particular instruction. The particular instructions are thus provided to the driver of the vehicle only when the geographic position of the vehicle is at or near the predetermined or preset waypoints or geographic locations corresponding to the respective particular instructions.

According to an aspect of the present invention, a navigation system for a vehicle includes a vehicle-based telematics system, a vehicle-based global positioning system and a control. The telematics system is operable to receive a user input and to download directional information from a remote source to the control of the vehicle in response to the user input (often, for instance, in ONSTAR®, the user input may be a request from the driver to the remote source or service center operator for directions to a particular destination) and an initial geographic position of the vehicle, such as typically determined by the vehicle-based global positioning system. The directional information comprises at least two instructions, with each instruction being coded to or associated with or linked to a respective geographic location or waypoint. The control is operable to provide an output corresponding to each of the at least two instructions in response to a then current geographic position of the vehicle. The control is operable to provide each instruction only when the then current geographic position of the vehicle at least generally matches or corresponds to the particular respective geographic location associated with the particular instruction.

For instance, a first instruction is typically downloaded that comprises information as to the initial geographic position and heading of the vehicle (e.g., "You are now heading East on Maple Street. Continue until you reach Oak Road."). A second instruction may then provide information as the vehicle approaches the appropriate turn or intersection or the like to take (e.g., "You are now within two blocks of Oak Road. Prepare to turn Right at Oak Road."). A subsequent instruction may then provide information as to the geographic position of the vehicle after the previous step has been completed (e.g., "You are now heading South on Oak Road. Continue until you reach Elm Street."). The output thus provides separate instructions or steps of the directional information, with each instruction coded to a particular geographic location and provided in response to the then current geographic position of the vehicle.

Also, if the driver of the vehicle does not correctly turn or passes an appropriate turn or the like, the control of the present invention knows this via an input from the in-vehicle or vehicle-based global positioning system. As a consequence, a warning instruction may be communicated to the driver indicating that the directions are not being appropriately followed (e.g., "You have passed Oak Road. Please execute a U-Turn and proceed West on Maple Street to Oak Road and turn Left at Oak Road."). Also, if the driver turns off a given road onto an incorrect road or otherwise strays from the given route, the control may communicate a similar warning or instruction to alert the driver that the vehicle is no longer traveling along the given route (e.g., "You have left Maple Street, but are not on Oak Road. Return to Maple Street and continue East on Maple Street to Oak Road, then turn Right on Oak Road,").

The control is operable to tag or code each of the instructions with a respective geographic location or waypoint (alternately, each of the instructions may be tagged or coded or associated with a respective geographic location or waypoint at the remote source before downloading to the control of the vehicle, without affecting the scope of the present invention). The control is then operable to only display a particular instruction when the geographic location tagged or coded to the particular instruction matches or generally matches the actual, then current geographic position of the vehicle.

The control also receives, preferably continuously, an input from the vehicle-based global positioning system that is indicative of the actual, current geographic position of the vehicle as the vehicle travels along the road, highway or the like. The control is then operable to compare the tagged or coded geographic location (as associated with the respective instructions) with the GPS-derived actual geographic position information. Thus, the control may determine when a particular instruction is appropriate to be displayed and/or communicated to the driver by determining that the GPS-derived actual geographic position of the vehicle is now at or at least close to the geographic location associated with a particular instruction.

The user input may comprise a vocal input from the driver of the vehicle to the remote source or service center, or may comprise a keypad input or the like, without affecting the scope of the present invention. Preferably, the geographic position of the vehicle is provided to the remote source (such as a service center or the like) via the global positioning system of the vehicle and the telematics system of the vehicle.

In one form, the output of the control is provided to the driver as an audible message. In another form, the output of the control is provided to the driver as a visible display. The visible display may comprise a video display element, an alphanumeric or iconistic display element or the like, and may comprise a display on demand type display element, a thin film transistor liquid crystal display element, a multi-pixel display element, and/or a multi-icon display element and/or the like. In another form, a combination of a visible and audible output may be used.

Optionally, the system may include a seat adjustment system that is operable to adjust a seat of the vehicle in response to data received via at least one of the vehicle-based telematics system and the vehicle-based global positioning system. The seat adjustment system may be operable in response to biometric data pertaining to the occupant of the seat of the vehicle.

According to another aspect of the present invention, a method for providing navigational directions to a driver of a vehicle comprises accessing a remote source or service center via a vehicle-based wireless communication system and downloading local information from the remote source to a control of the vehicle via the wireless communication system in response to a user input. The local information comprises at least two driving instructions. Each of the at least two driving instructions is associated with or linked to a respective, particular geographic location. A current geographic position of the vehicle is provided to the control via a vehicle-based global positioning system. Each of the at least two driving instructions is provided by the control to the driver in response to the then current geographic position of the vehicle and only when the current geographic position of the vehicle at least generally matches or corresponds to the particular geographic location electronically associated with or linked to the respective one of the at least two driving instructions.

Preferably, the method includes associating or tagging or coding or linking (such as electronically, digitally or the like) each of the instructions with a respective particular geographic location. The control may tag or code the instructions to be associated with the respective geographic locations after the instructions have been downloaded, or the remote service center may tag or code the instructions to be associated with the respective geographic locations before downloading the instructions to the control, without affecting the scope of the present invention.

In one form, the at least two driving instructions are visibly displayed to the driver at a display of the vehicle. In another form, the at least two driving instructions are audibly communicated to the driver via at least one speaker of the vehicle. In a third form, a combination of a visible display and audible communication may be used.

According to yet another aspect of the present invention, a navigation system for a vehicle comprises a vehicle-based telematics system, a vehicle-based global positioning system, and a control. The telematics system is operable to receive a user input from a driver of the vehicle and to download directional information to the control of the vehicle in response to the user input and an initial geographic position of the vehicle. The directional information comprises at least two instructions. The control is operable to tag or code or link each of the instructions with a respective geographic location. The control is operable to provide an output corresponding to a particular instruction only when the geographic location tagged or coded or linked to the particular instruction at least generally corresponds to the actual current geographic position of the vehicle.

The present invention thus provides for step-by-step instructions or driving directions to the driver of a vehicle as the driver is driving the vehicle according to the instructions. Each step or instruction is provided either after the previous step or instruction has been completed or as the vehicle approaches a turn or intersection or location where the next step is to be performed, so that the driver is not overwhelmed with multiple instructions to remember as the driver drives the vehicle toward the targeted destination. The control or the remote source or service center is operable to electronically or digitally or otherwise tag, key, code or otherwise associate each instruction or step with a geographic location or waypoint, and the control is operable to only display that instruction when the geographic location tagged to the instruction generally matches the actual, current geographic position of the vehicle. All of the instructions are provided or downloaded to the vehicle during a single, short communication with the remote source or service center via the telematics system, so as to avoid multiple communications to the remote service center or a lengthy communication with the remote service center, thereby reducing the cost of the instruction service to the driver of the vehicle.

These and other objects, advantages, purposes, and features of the present invention will become more apparent from the study of the following description taken in conjunction with the drawings.

DESCRIPTION OF THE PREFERRED EMBODIMENTS

Figure 1:
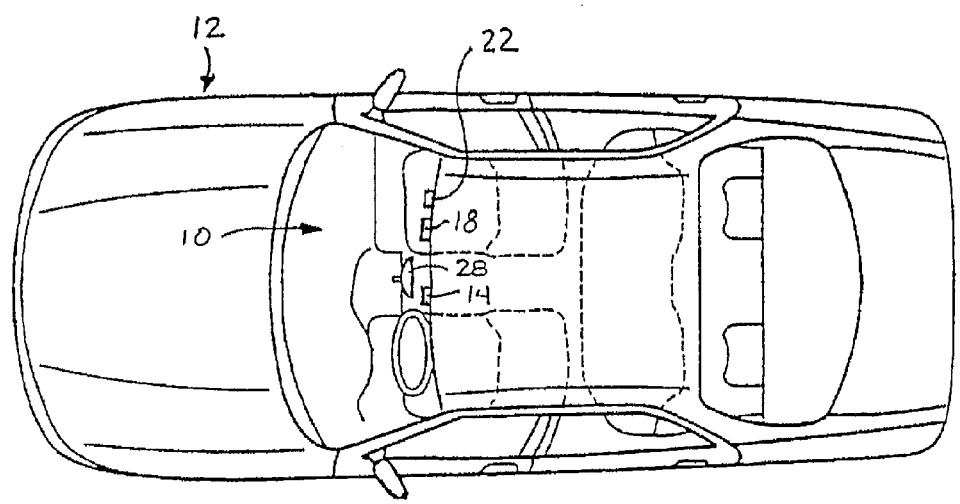
FIG. 1 is a top plan view of a vehicle incorporating a navigation system in accordance with the present invention.
Figure 2:
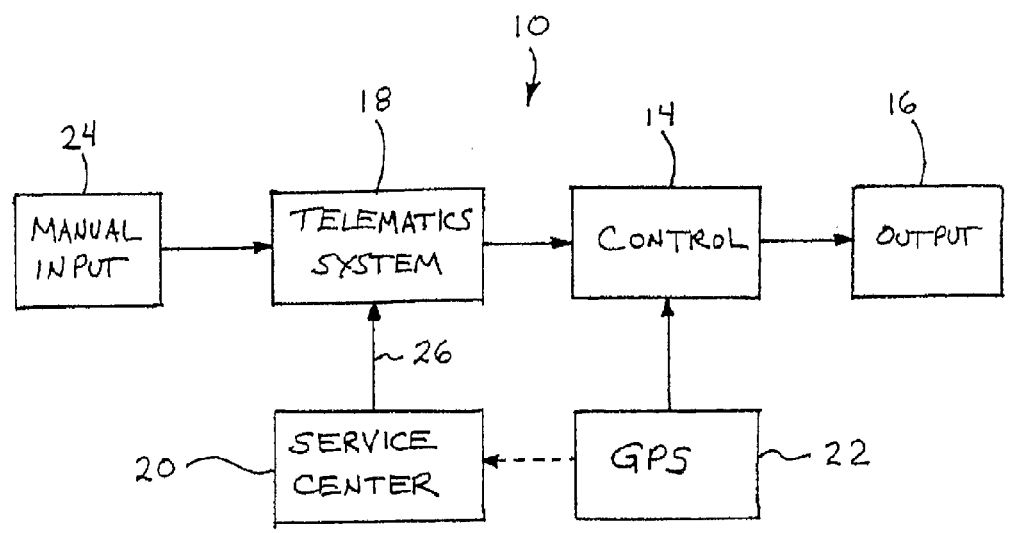
FIG. 2 is a block diagram of a navigation system in accordance with the present invention.

Referring now to the drawings and the illustrative embodiments depicted therein, a navigation system 10 of a vehicle 12 includes a control 14 which is operable to communicate an output 16, such as step-by-step directions or driving instructions, to a driver of the vehicle based on an initial, current or present geographic position of the vehicle and the desired or targeted final destination of the vehicle (FIGS. 1 and 2). The initial geographic position of the vehicle and the targeted destination is communicated to a remote source or service center 20 via a telematics system 18 of the vehicle and a global positioning system 22 of the vehicle. In response to a user input 24 from the driver or other occupant of the vehicle and the initial geographic position of the vehicle, the service center 20 provides or downloads a set of instructions or driving directions 26, which is received by the control 14 from the service center via the telematics system or wireless communication system 18 of the vehicle. Each of the particular instructions is electronically or digitally or otherwise coded, tagged, keyed, or otherwise associated with a respective particular geographic location or waypoint. The control 14 then provides the instructions or output 16 to the driver in a step-by-step manner based on the GPS-derived, actual, then current geographic position of the vehicle, and with the stepping from one step to the subsequent step of the instructions being linked to the then current geographic position of the vehicle in relation to the particular geographic locations or waypoints associated with the instructions, as discussed below.

The driver or the other occupant of the vehicle provides the user input 24 to the telematics system or wireless communication system 18 of the vehicle. The user input 24 may include a vocal communication or request for driving instructions or directional information to the final destination to an operator or voice input/recognition system of the service center or the like 20 associated with the telematics system 18 of the vehicle, or may be a keyed-in request or instructions via a keypad or the like to a remote computer system or computerized service center or the like, without affecting the scope of the present invention. The driver or other occupant of the vehicle may provide (such as via a vocal communication or via a keypad input or the like) the initial position of the vehicle to the service center or the geographic position of the vehicle may be communicated to the service center via a global positioning system 22 of the vehicle.

The remote service center 20 is then operable to download the local map and/or the driving instructions or directions to a memory storage or control 14 of the vehicle while the communication link is open between the service center and the vehicle. Because only the local information necessary to direct the driver to the targeted destination is downloaded to the control or memory of the vehicle, the download may be completed in a relatively short period of time (thus minimizing the time and cost of the communication) and does not require a large amount of memory or storage space for the information. After the instructions or directions are downloaded to the vehicle, the driver may disconnect from the service center to avoid additional charges for the communication and service.

Each of the output instructions provided by the control is electronically or digitally or otherwise keyed or coded or tagged or otherwise associated with or linked to a respective or corresponding geographic location or waypoint. The instructions may be tagged or coded by the remote source or service center before the instructions are downloaded to the vehicle, or the instructions may be tagged or coded by the control at the vehicle after the instructions have been downloaded to the control, without affecting the scope of the present invention.

The control 14 also receives, preferably continuously, an input from the in-vehicle or vehicle-based global positioning system 22 which is indicative of the actual, current geographic position of the vehicle as it travels along the road, highway or the like. The control is then operable to compare the tagged or coded geographic locations as associated with the respective instructions with the GPS-derived actual geographic position information. Thus, the control is operable to determine when a particular instruction is appropriate to be displayed or communicated to the driver of the vehicle by determining that the actual GPS-derived geographic position of the vehicle is now at or at least close to the geographic location associated with a particular instruction. The control is then operable to provide the separate or particular output instructions to the driver of the vehicle in response to the actual, then current geographic position of the vehicle matching or corresponding to or approaching a particular geographic location or waypoint keyed to or coded to or tagged to or associated with a respective, particular instruction.

Preferably, the output or instructions are provided to the driver of the vehicle in a step-by-step manner, where each individual instruction or step is provided based on the then current geographic position of the vehicle with respect to the keyed or coded geographic location. More particularly, each particular instruction is provided to the driver by the control only when the actual geographic position of the vehicle at least generally corresponds to or matches the particular geographic location associated with or linked to the respective, particular instruction. The particular instruction is thus provided to the driver of the vehicle at the particular time at which the vehicle is positioned at or near a geographic location where the particular instruction is most useful to the driver of the vehicle.

For example, an initial instruction may be electronically or digitally coded to the initial geographic position of the vehicle when the directions/instructions are first requested (e.g., "You are heading East on First Street"). Each subsequent individual step may be provided in response to the control detecting or determining (in response to an output of the global positioning system) that the vehicle is approaching, at or near the next geographic location or waypoint, such as a turn, location, intersection or the like, at which the next step is to be performed (e.g., the car is approaching and within a predetermined or threshold distance from Main Street and the next instruction is "Turn Left on Main Street"), or in response to the control detecting or determining (again in response to the global positioning system of the vehicle) that a previous instruction or step has been completed (e.g., the car has turned left and is now traveling along Main Street and the next instruction is "Proceed North on Main Street"). The control is thus operable to provide the next step or instruction only when the driver can readily understand the instruction and focus on performing that particular step. The driver thus does not have to remember all of the multiple steps or turns or street names or exits or the like while also driving the vehicle. The driver also thus does not have to remain on the line with the remote service center operator and/or does not have to repeatedly contact the service center to obtain the instructions again if any of the instructions are forgotten, since the local instructions and/or map have been downloaded to the vehicle.

The telematics system or wireless communication system 18 of the vehicle may be operable to connect to a corresponding service center or operator or voice input/recognition system or the like 20 which may provide a variety of information or assistance to the driver of the vehicle in response to a vocal message from the driver or other occupant of the vehicle (although the user input may be a keypad input or the like to a computerized service center or the like, without affecting the scope of the present invention). Such a communication system and service center may be substantially similar to known systems and centers, such as General Motors' ONSTAR®, Daimler's TELEAID™, Ford's RESCU® or the like, which are common in vehicles today. The communication link may be accomplished utilizing various linking principles, such as the principles disclosed in commonly assigned U.S. Pat. Nos. 6,420,975; 6,278,377; 6,243,003; 6,329,925; 6,428,172; 6,326,613, the disclosures of which are hereby incorporated herein by reference.

The driver or occupant of the vehicle may actuate a communication link (such as via a push button or the like at the interior rearview mirror or at a console of the vehicle), and request from the operator, such as via a voice input, the driving instructions or directions as to how to get to a desired or targeted location or destination. The service center may receive the initial geographic position of the vehicle (such as in response to the global positioning system of the vehicle or from the driver), and may access a database to obtain the appropriate local map and/or local directions to the targeted destination. The operator may even access the vast data banks available at the service center for destinations or locations and may provide human interaction to help find the destination of choice if the driver does not know the exact address. The operator or service center then downloads the local information or step-by-step or turn-by-turn directions 26 to the control or memory or storage system 14 of the vehicle 12 in a single download. Optionally, it is envisioned that the service center may download or provide the information to the vehicle in real time (which may result in a longer opened communication link between the vehicle and the service center), without affecting the scope of the present invention.

The control 14 is operable to provide the downloaded instructions to the driver of the vehicle while the vehicle is driven by the driver toward the targeted destination. The control 14 provides the information or directions or output 16, such as when/where to turn, how far until the turn, and the direction to travel, to the driver as needed. The control may be operable to update the output display or message in real time based on the current geographic position of the vehicle as the vehicle travels along the given route.

The output or instructions may be provided to the driver by the control via an audible message or signal, such as via one or more speakers of the vehicle, such as by utilizing principles of audio systems of the types disclosed in commonly assigned U.S. Pat. Nos. 6,243,003; 6,278,377; and 6,420,975, which are hereby incorporated herein by reference, or may be provided via a display, such as in a display of an interior rearview mirror 28, such as a scrolling display of the type disclosed in commonly assigned U.S. patent application Ser. No. 09/799,414, filed Mar. 5, 2001 by McCarthy et al. for COMPLETE MIRROR-BASED GLOBAL-POSITIONING SYSTEM (GPS) NAVIGATION SOLUTION, now U.S. Pat. No. 6,477,464, which is hereby incorporated herein by reference, or a display on demand type display, such as the types disclosed in commonly assigned U.S. Pat. Nos. 5,668,663 and 5,724,187, and U.S. patent application Ser. No. 10/054,633, filed Jan. 22, 2002 by Lynam et al. for VEHICULAR LIGHTING SYSTEM, now U.S. Pat. No. 7,195,381; and Ser. No. 09/793,002, filed Feb. 26, 2001, entitled VIDEO MIRROR SYSTEMS INCORPORATING AN ACCESSORY MODULE, now U.S. Pat. No. 6,690,268, the entire disclosures of which are hereby incorporated herein by reference, or in a display screen or the like at the interior rearview mirror assembly or elsewhere within the vehicle, without affecting the scope of the present invention. Other types of visible displays or locations for such visible displays may be utilized, such as at an accessory module or pod or windshield electronic module, an instrument panel of the vehicle, a console of the vehicle and/or the like, without affecting the scope of the present invention. The visible display may comprise written instructions, icons (such as left and right arrows or the like), or any other characters or symbols or indicia which convey to the driver of the vehicle when/where to turn and/or which direction to travel in order to arrive at the targeted destination. Optionally, the output may comprise a combination of a visible display and an audible message or signal, without affecting the scope of the present invention.

As indicated above, a variety of means may be utilized to visually convey the direction instructions to the driver of the vehicle. For example, and such as described in U.S. patent application Ser. No. 09/799,414, filed Mar. 5, 2001 by McCarthy et al. for COMPLETE MIRROR-BASED GLOBAL-POSITIONING SYSTEM (GPS) NAVIGATION SOLUTION, now U.S. Pat. No. 6,477,464, which is hereby incorporated herein by reference, a text display may be provided and/or an iconistic display may be provided, such as a display readable through the interior rearview mirror reflective element itself. In this regard, use of a display on demand (DOD) type display (such as disclosed in commonly assigned, U.S. patent application Ser. No. 10/054,633, filed Jan. 22, 2002 by Lynam et al. for VEHICULAR LIGHTING SYSTEM, now U.S. Pat. No. 7,195,381, and Ser. No. 09/793,002, filed Feb. 26, 2001, entitled VIDEO MIRROR SYSTEMS INCORPORATING AN ACCESSORY MODULE, now U.S. Pat. No. 6,690,268, and in U.S. Pat. Nos. 5,668,663 and 5,724,187, the entire disclosures of which are hereby incorporated by reference herein), may be preferred. For example, a video display element or a video display screen or an information display element can be used (such as an elongated alphanumeric/multi-pixel/multi-icon display element and/or such as an LCD display or an emitting display element, such as a multi-pixel electroluminescent display or field emission display or light emitting diode display (organic or inorganic) or the like) which is disposed within the mirror housing of the interior mirror assembly of the vehicle, and located behind the mirror reflective element in the mirror housing, and configured so that the information displayed by the display element (that is positioned to the rear of the reflector of the mirror reflective element) is viewable by the driver through the mirror reflective element. Such a display can be accomplished by partially or wholly removing the reflector in the area of the display or, more preferably, by providing a display on demand type display, whereby the reflective element comprises a transflective element, as discussed below.

Preferably, and such as is disclosed in U.S. patent application Ser. No. 09/793,002, filed Feb. 26, 2001, entitled VIDEO MIRROR SYSTEMS INCORPORATING AN ACCESSORY MODULE, now U.S. Pat. No. 6,690,268, the video display screen or other visible display element or elements may be disposed behind the mirror reflective element so that the information displayed is visible by viewing through the mirror reflective element of the interior rearview mirror assembly, with the reflective element preferably comprising a transflective mirror reflector such that the mirror reflective element is significantly transmitting to visible light incident from its rear (i.e. the portion furthest from the driver in the vehicle), with at least about 15% transmission preferred, at least about 20% transmission more preferred, and at least about 25% transmission most preferred, while, simultaneously, the mirror reflective element is substantially reflective to visible light incident from its front (i.e. the position closest to the driver when the interior mirror assembly is mounted in the vehicle), with at least about 60% reflectance preferred, at least about 70% reflectance more preferred, and at least about 75% reflectance most preferred.

Preferably, a transflective electrochromic reflective mirror element is used (such as is disclosed in U.S. patent application Ser. No. 09/793,002, filed Feb. 26, 2001, entitled VIDEO MIRROR SYSTEMS INCORPORATING AN ACCESSORY MODULE, now U.S. Pat. No. 6,690,268; and/or in U.S. Pat. Nos. 5,668,663 and 5,724,187, the entire disclosures of which are hereby incorporated by reference herein) that comprises an electrochromic medium sandwiched between two substrates. With the likes of a TFT LCD video display or a light emitting information display disposed behind the rear substrate of a third-surface transflective electrochromic mirror reflective element in a "display-on-demand" configuration (such as disclosed in U.S. patent application Ser. No. 10/054,633, filed Jan. 22, 2002 by Lynam et al. for VEHICULAR LIGHTING SYSTEM, now U.S. Pat. No. 7,195,381, and Ser. No. 09/793,002, filed Feb. 26, 2001, entitled VIDEO MIRROR SYSTEMS INCORPORATING AN ACCESSORY MODULE, now U.S. Pat. No. 6,690,268, which are hereby incorporated herein by reference), the presence of (and the image or information displayed by) the video display screen or information display is only principally visible to the driver (who views the display through the transflective mirror reflective element) when the information display element is powered so as to transmit light from the rear of the mirror reflective element through the transflective mirror reflector to reach the eyes of the driver. Preferably, a single high-intensity power LED, such as a white light emitting LED comprising a Luxeon™ Star Power LXHL-MW1A white light emitting LED having (at a 25 degree Celsius junction temperature) a minimum forward voltage of 2.55 volts, a typical forward voltage of 3.42 volts, a maximum forward voltage of 3.99 volts, a dynamic resistance of 1 ohm and a forward current of 350 milliamps, and as available from Lumileds Lighting LLC of San Jose, Calif., is used as a backlight for the TFT LCD video screen. Alternately, a plurality of such single high-intensity power LEDs (such as an array of two or of four such power LEDs) may be placed behind the TFT LCD video screen so that the intense white light projected from the individual single high-intensity power LEDs passes through the TFT LCD element and through the transflective electrochromic element, preferably producing a display intensity as viewed by the driver of at least about 200 candelas/sq. meter; more preferably at least about 300 candelas/sq. meter; and most preferably at least about 400 candelas/sq. meter. Alternately, cold cathode vacuum fluorescent sources/tubes can be used for backlighting and optionally can be used in conjunction with LED backlighting.

Optionally, and in accordance with incorporated U.S. patent application Ser. No. 09/793,002, now U.S. Pat. No. 6,690,268, a reverse-aid rearward viewing camera can be mounted to the rear of the vehicle in order to display to the driver, upon selecting a reverse gear, a field of view immediately rearward of the vehicle so as to assist the driver in reversing the vehicle. Such vehicle reverse-aid camera systems are disclosed in U.S. patent application Ser. No. 09/361,814, entitled WIDE ANGLE IMAGING SYSTEM to Bos of Donnelly Corporation, filed Jul. 27, 1999, now U.S. Pat. No. 6,201,642, and in U.S. patent application Ser. No. 09/199,907 entitled WIDE ANGLE IMAGE CAPTURE SYSTEM FOR VEHICLE to Bos et al. of Donnelly Corporation, filed Nov. 25, 1998, now U.S. Pat. No. 6,717,610, and in U.S. patent application Ser. No. 09/313,139 entitled REARVIEW VISION SYSTEM WITH INDICIA OF BACKUP TRAVEL to Schofield et al. of Donnelly Corporation, filed May 17, 1999, now U.S. Pat. No. 6,222,447; VEHICLE CAMERA DISPLAY, Ser. No. 09/776,625, filed Feb. 5, 2001, by Kenneth Schofield et al., now U.S. Pat. No. 6,611,202.

Note that other display locations are possible for display of the video image or information display, such as a map and/or a text message comprising driving instructions, to the driver or occupant of the vehicle. For example, a video image may be displayed on an LCD video screen of flip-down display (such as is disclosed in U.S. patent application Ser. No. 09/793,002, filed Feb. 26, 2001, entitled VIDEO MIRROR SYSTEMS INCORPORATING AN ACCESSORY MODULE, now U.S. Pat. No. 6,690,268, incorporated above), or on a video screen incorporated into the rearview mirror assembly, such as the type disclosed in U.S. provisional applications, Ser. No. 60/439,626, filed Jan. 13, 2003; Ser. No. 60/489,812, filed Jul. 24, 2003; and Ser. No. 60/492,225, filed Aug. 1, 2003, which are hereby incorporated herein by reference. Optionally, for example, a video display located in the front instrument panel can be used, or a video display located in an overhead console (such as an overhead accessory module or system as described in U.S. provisional applications, Ser. No. 60/489,812, filed Jul. 24, 2003; and Ser. No. 60/492,225, filed Aug. 1, 2003, which are hereby incorporated herein by reference) can be used, without affecting the scope of the present invention.

Alternately, as outlined above, a local area map may be downloaded to the control from the external service provider or service center and the control may be operable (such as by using the principles disclosed in U.S. patent application Ser. No. 10/054,633, filed Jan. 22, 2002 by Lynam et al. for VEHICULAR LIGHTING SYSTEM, now U.S. Pat. No. 7,195,381, and Ser. No. 09/793,002, filed Feb. 26, 2001, entitled VIDEO MIRROR SYSTEMS INCORPORATING AN ACCESSORY MODULE, now U.S. Pat. No. 6,690,268, which are hereby incorporated herein by reference) to feed such a map to the likes of a thin film transistor (TFT) liquid crystal (LC) video screen or other type of video screen or display element or display system, and with the instructions being conveyed by alphanumeric characters and/or indicia or the like and/or by highlighting portions of the map display. Such highlighting may be controlled by the in-vehicle control or control unit based on actual, current vehicle position information as determined by the in-vehicle or vehicle-based global positioning system. Thus, the vehicle owner need not buy into or have in the vehicle a full map of all areas to which the vehicle may be driven (such as regional maps or national maps or the like).

Alternately, a low cost, multi-pixel display (such as the type disclosed in U.S. provisional application Ser. No. 60/373,932, filed Apr. 19, 2002 by McMahon for VEHICLE IMAGING SYSTEM, and in U.S. patent application Ser. No. 10/418,486, filed Apr. 18, 2003 by McMahon et al. for VEHICLE IMAGING SYSTEM, now U.S. Pat. No. 7,005, 974, which are hereby incorporated herein by reference), such as a low cost multi-pixel vacuum fluorescent display, a low cost multi-pixel organic light emitting diode (OLED), a low cost multi-pixel field emission display, or any other or similar multi-pixel light emitting display or the like may be utilized, without affecting the scope of the present invention. The local area map, with the instructions iconistically displayed thereon, may be displayed on such a multi-pixel display or the like in response to the control receiving an input or download from the telematics system and/or the in-vehicle or vehicle-based global positioning system.

It is further envisioned that the control may provide a warning or alert to the driver of the vehicle when the actual geographic position of the vehicle (as provided by the global positioning system of the vehicle) is not where it should be based on the instructions received from the remote service center. For example, the control may instruct the driver to turn around or otherwise get back onto the given route, or the control may instruct the driver to contact the service center to obtain updated directions based on the new position of the vehicle. This may be done if, for example, the geographic position of the vehicle is outside of a predetermined or threshold range or distance of the next location or waypoint, or if the geographic position of the vehicle is past the location or waypoint. Optionally, the control may provide audible chirps or other audible signal or the like delivered by a speaker to alert the driver when approaching a turn or to indicate to the driver that the driver has missed a turn.

The control may also be operable to continuously monitor the actual geographic position of the vehicle and compare to the locations or waypoints associated with the instructions even after the vehicle has strayed from the given route. As discussed above, the control may provide instructions to turn around to get back on the given route. However, if the vehicle continues along a different path (such as in situations where the driver gets lost and attempts to find a way back to the given route, or where the driver may take an alternate route, such as an alternate route known to the driver or a detour or the like), but eventually arrives at one of the geographic locations or waypoints associated with the downloaded instructions, the control may be operable to recognize that the vehicle is back on the given route and resume communicating/displaying the appropriate instructions to the driver to direct the driver to the targeted destination.

During operation, as the driver is driving the vehicle, the driver may access or contact a service center via the telematics system 18 of the vehicle, such as ONSTAR®, TELEAID™, RESCU® or the like, depending on the type of vehicle, and request driving directions to a particular desired destination or targeted location. The operator or service center may provide the directions to the desired destination from the known position of the vehicle (which may be provided by the driver to the service center or may be known by the service center in response to the global positioning system of the vehicle). Preferably, the service center communicates the directions and downloads the directions to a storage location or control of the vehicle. The directions or instructions are electronically or digitally or otherwise coded or tagged or otherwise associated with or linked to a particular geographic location or waypoint either by the remote service center or by the control. The control is then operable to provide the directions in sections or parts or steps, with each separate, particular step or instruction being provided to the driver in response to the current geographic position of the vehicle (based on a signal from the global positioning system of the vehicle) generally corresponding to a particular geographic location or waypoint associated with the particular step or instruction. For example, a step may be provided in response to the vehicle completing a previous step of the directions, and/or may be provided in response to the vehicle approaching (such as the vehicle being within a threshold distance of) the street, intersection, location or the like at which the next step or turn is to be performed, without affecting the scope of the present invention.

Therefore, the present invention provides a navigation system which is operable to provide step-by-step instructions to a targeted destination to a driver of a vehicle while the driver is driving the vehicle toward the targeted destination. The instructions are downloaded from a remote database at a remote service center or the like via a telematics system or wireless communication system of the vehicle. The instructions may then be provided to the driver only as needed by the driver, since they are coded or associated with or linked to particular geographic locations or waypoints, thereby simplifying the instructions so that the driver will be able to understand each step and execute the step accordingly. The instructions may be downloaded to a storage or memory location or system of the vehicle during a brief communication or connection with the remote service center, so that the driver does not have to remain connected with the remote service center or repeatedly contact the service center to receive updated instructions as the driver drives the vehicle toward the targeted destination. The downloaded instructions are only the local instructions and thus do not require an excessive amount of time to download nor do they require an excessive amount of storage space or memory on the control. Thus, the remote service center, operator, computerized system or the like maintains the detailed maps and directories, and feeds back or downloads wirelessly to the vehicle the local information or map for communication or display to the driver of the vehicle for directional guidance information.

Optionally, the telematics system or communication link or other system may be operable to download data, such as via ONSTAR® or other communication system, or via a global positioning system or the like, to the vehicle or to a control or system or accessory of the vehicle. The data may be used to adjust an accessory or system of the vehicle or to set the accessory or system of the vehicle to a desired or appropriate setting in response to the data and/or in response to other vehicle or driver characteristics or status.

For example, data pertaining to the location of the vehicle, the time of day, the date, weather conditions and/or driving conditions may be provided to the vehicle for use in adjustment of an accessory or system of the vehicle. For example, such data may be used by a seat adjustment system, such that adjustment of the driver or passenger seat of the vehicle may be made in response to changes in such data. This may be beneficial because, for example, during long journeys, the seat adjustment or position at the start of the journey may not be comfortable or appropriate later on in the long journey. The seat adjustment system of the present invention thus may be operable to adjust the seat position or lumbar support or the like (and the mirror position or positions may also be adjusted accordingly) in response to various conditions, such as the length of the journey, altitude of the vehicle, driving conditions and/or the like. The seat adjustment system thus may make dynamic adjustments of the seat or seats to keep the driver or occupants of the vehicle comfortable or alert.

Optionally, it is envisioned that the seats of the vehicle may have a massage capability. In such applications, the seat adjustment system or seat control system may detect that the vehicle is on a long journey, and may activate the massage function to enhance the comfort to the driver of the vehicle. Such an adjustment or control may also be enabled if rural highway conditions are detected or other driving conditions where such a feature may be desired. It is further envisioned that the seat adjustment or control system may be programmable, such that a particular driver or occupant may indicate what changes he or she may desire in certain conditions. The seat adjustment system may then automatically activate such features or changes when the specified conditions are detected.

Optionally, the adjustment may also or otherwise be made in response to biometric data about the driver or occupant that is presently occupying the seat. It is known to use body measurements to order clothing tailored to the body measurements. Many catalogue clothing companies are now taking body scan measurements to order clothing on line. These measurements ensure a substantially perfect fit of the ordered clothing. Such body scan measurements or data or other such biometric data may be entered into the vehicle seat adjustment system, or may be communicated to the vehicle seat adjustment system, such as via the telematics system or other communication system or data system or the like. The seat adjustment system may then adjust the seat (and the mirrors may be adjusted as well) in response to detection of a particular person and/or their biometric characteristics or data.

Figure 3:
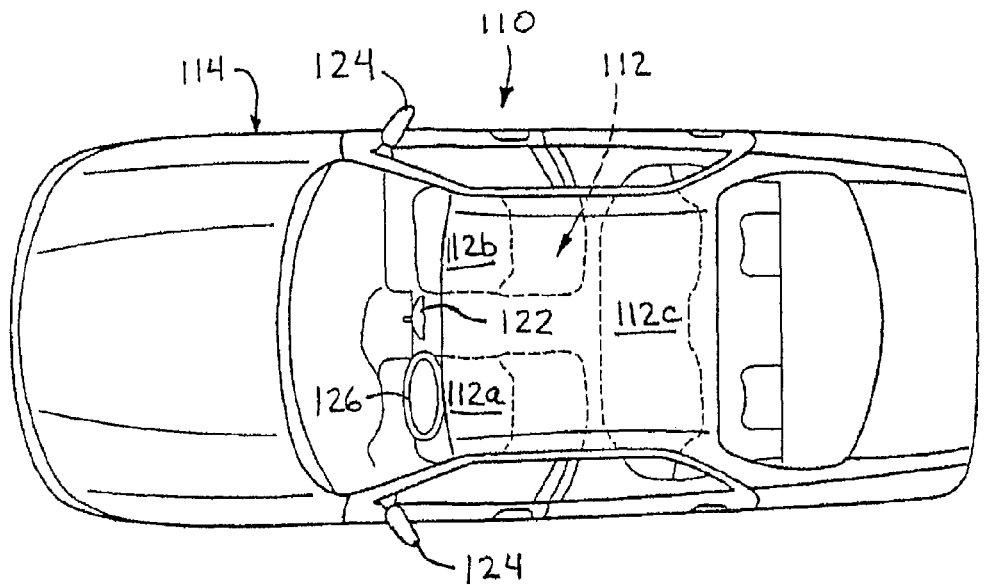
FIG. 3 is a top plan view of a vehicle incorporating a seat adjustment system in accordance with the present invention.
Figure 4:
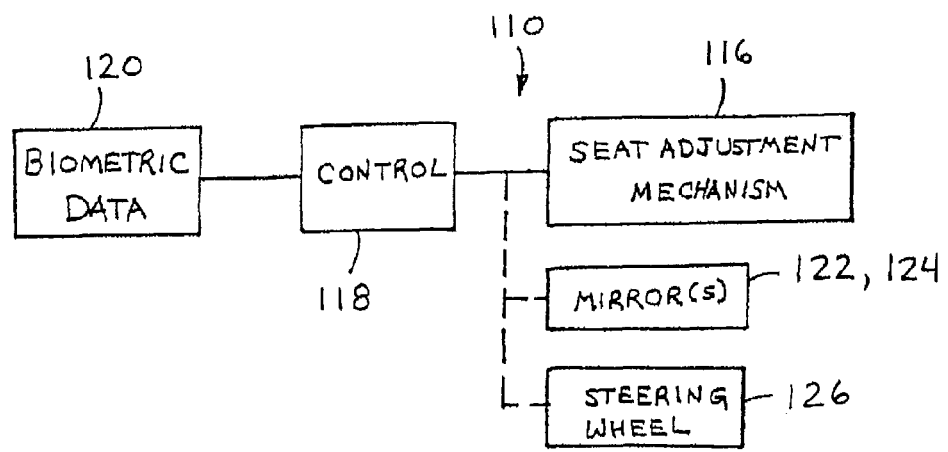
FIG. 4 is a block diagram of a seat adjustment system in accordance with the present invention.

Referring now FIGS. 3 and 4, a biometric seat adjustment system 110 is operable to adjust the seats 112 of a vehicle 114. The biometric seat adjustment system 110 may adjust a driver seat 112a, a front passenger seat 112b, and/or one or more rear passenger seats 112c via a powered seat adjustment mechanism 116 (FIG. 4) at the respective seats in response to biometric data or information pertaining to a person that may be sitting in or may be about to sit in one of the vehicle seats. As shown in FIG. 4, biometric seat adjustment system 110 includes a control 118, which may store biometric data 120 in a memory and/or may receive biometric data 120 from a remote source or an input device or communication (not shown). Control 118 is operable to control or adjust the seat adjustment mechanism 116 to adjust the seats 112 of the vehicle (such as lumbar support, seat travel, seat height, etc.) in response to the stored biometric data and/or input. For example, a person may have their biometric data or characteristics stored in a memory of control 118, and may select a particular code or setting corresponding to their data (such as "position 1" of the seat adjustment system), whereby control 118 adjusts the adjustment mechanism of the particular selected seat in response to the data. Alternately, a person may have their biometric data or characteristics stored in a portable device (such as a key fob, PDA, or the like) or at a remote location or device, and may have the biometric data or characteristic communicated to the control 118, whereby control 118 may adjust the adjustment mechanism of the particular selected seat in response to the communication. The control 118 may also be operable to control or adjust a setting of an interior rearview mirror 122, an exterior rearview mirror or mirrors 124, a steering wheel 126 and/or the like in response to the input or communication.

The present invention thus provides a vehicle seat adjustment in response to biometric data, such as various body dimensions, weight, sex, age and the like. Such body dimension measurements, such as those taken for ordering clothing, may be made on a person and may be contained in the person's computer or the like, along with other biometric data or characteristics of the person (and optionally may include preferences of the person). These data may be loaded into the vehicle computer and/or seat adjustment system. The seat adjustment system receives the data and may be operable to pre-adjust the driver seat (or passenger seat or other seat) of the vehicle in response to the data so that the seat that the person will sit in is set to the person's precise body measurements and other data. Additionally, the adjustment system may pre-adjust an interior rearview mirror, exterior rearview mirror or minors, steering wheel and/or the like in response to the measurements or inputs.

The body dimensions may be saved in a person's computer or PDA, such as done for ordering clothing. Such measurement and saving technology now exists and is used by some catalogues, such as Lands' End and/or Levi (which provides for measurements in their stores and these measurements are stored in the person's file for ordering perfect fit jeans). Alternately, a vehicle dealer may perform simple measurements on a person (like a tailor with a new suit). This information may then be used to adjust the seat in the person's vehicle to the person's body size, weight, age, sex, etc. For example, the vehicle dealer may download the information or data for a person or person's (such as a driver and their spouse) into memory positions 1 and 2 of a vehicle seat adjustment memory of the person's vehicle. Optionally, the data may be downloaded into a Bluetooth (or other communication protocol) enabled phone, PDA or key fob, which may then be used to communicate the data to the targeted vehicle. Such an approach would be particularly suitable for and advantageous to use with rental cars.

The biometric seat adjustment system preferably utilizes the normal memory seat adjustment system or mechanisms currently in some vehicles, such as high end vehicles. While the seats today can be adjusted to a person's particular preferences, it is likely that most people take awhile to get themselves comfortable. By using a few body dimensions and the person's weight (and maybe other information or characteristics as well), the present invention may set the seat or seats substantially perfectly before or when the person or persons first get into the vehicle.

It is envisioned that the biometric data measurement event may occur in the vehicle (such as by an in-vehicle laser or similar scanners and/or cameras that measure the driver's and/or passengers' biometric dimensions). Alternately, the biometric data may be measured external to the vehicle (such as at a dealership "booth" when the driver is ordering and/or receiving delivery of the vehicle or at a biometric measurement booth at a Mall or other store or facility or the like) and may be provided to the vehicle in a manner such as described above and/or via, for example, an ONSTAR® telematics service or via a similar telecommunication system or event or the like.

It is further envisioned that more than the seat or seats (lumbar support/seat travel/seat height etc.) may be adjusted in response to the individual biometric data stored in or communicated to the vehicle memory system. For example, exterior and/or interior mirror reflective elements may be moved or adjusted in response to such stored or input biometrics data, which may be called up or loaded when that particular individual sits in one of the seats of the vehicle. Additionally, other accessories or systems of the vehicle may be adjusted or customized, such as suspension characteristics; steering column tilt; size of display characters (for example, older drivers may desire larger alphanumerical display digits); and/or the like, in response to the biometric data of a particular individual.

Therefore, the present invention provides a navigation system which is operable to provide step-by-step instructions to a targeted destination to a driver of a vehicle while the driver is driving the vehicle toward the targeted destination. The instructions are downloaded from a remote database at a remote service center or the like via a telematics system or wireless communication system of the vehicle. The instructions may then be provided to the driver only as needed by the driver, since they are coded or associated with or linked to particular geographic locations or waypoints, thereby simplifying the instructions so that the driver will be able to understand each step and execute the step accordingly. The present invention may also provide a seat adjustment function that automatically adjusts the seat of the vehicle in response to data communicated to the vehicle via a telematics system or a global positioning system or the like. The seat adjustment system or function may be operable to adjust the seat of the vehicle in response to biometric data of the person occupying the seat. The interior and/or exterior rearview mirrors may also be adjusted in response to the data or seat adjustments.

Changes and modifications in the specifically described embodiments may be carried out without departing from the principles of the present invention, which is intended to be limited only by the scope of the appended claims as interpreted according to the principles of patent law.

The invention claimed is:

1. A vehicular wireless communication system for a vehicle, said vehicular wireless communication system comprising:
    a control in an equipped vehicle operable to communicate with an external service provider via a wireless communication link between the equipped vehicle and the external service provider, wherein said control receives a user input from the driver of the equipped vehicle, and responsive thereto, establishes said wireless communication link between the equipped vehicle and the external service provider;
    wherein data from the external service provider is downloaded to said control via said wireless communication link;
    said control comprising memory for storing downloaded data at least after said wireless communication link established between said control and the external service provider is disconnected; and
    wherein said control controls at least one accessory of the vehicle responsive to at least one of (a) a geographic location of the vehicle as determined by a global positioning system of the equipped vehicle and (b) a biometric characteristic of an occupant of the equipped vehicle.

2. The vehicular wireless communication system of claim 1, wherein said control controls at least one accessory of the vehicle responsive to a biometric characteristic of an occupant of the equipped vehicle.

3. The vehicular wireless communication system of claim 2, wherein said at least one accessory comprises a seat adjustment system operable to adjust a seat of the equipped vehicle responsive to a biometric characteristic of an occupant of the equipped vehicle.

4. The vehicular wireless communication system of claim 3, wherein said seat adjustment system is operable to adjust a seat of the equipped vehicle in response to biometric data, said biometric data pertaining to the occupant of the seat of the equipped vehicle.

5. The vehicular wireless communication system of claim 4, wherein said at least one accessory comprises a mirror adjustment system that is operable to at least one of (a) adjust a setting of an interior rearview mirror of the equipped vehicle responsive at least in part to said biometric data and (b) adjust a setting of an exterior rearview mirror of the equipped vehicle responsive at least in part to said biometric data.

6. The vehicular wireless communication system of claim 2, wherein said at least one accessory comprises a mirror adjustment system that is operable to at least one of (a) adjust a setting of an interior rearview mirror of the equipped vehicle responsive to a biometric characteristic of an occupant of the equipped vehicle and (b) adjust a setting of an exterior rearview mirror of the equipped vehicle responsive to a biometric characteristic of an occupant of the equipped vehicle.

7. The vehicular wireless communication system of claim 1, wherein said at least one accessory comprises a mirror adjustment system that is operable to at least one of (a) adjust a setting of an interior rearview mirror of the equipped vehicle and (b) adjust a setting of an exterior rearview mirror of the equipped vehicle.

8. The vehicular wireless communication system of claim 1, wherein said downloaded data comprises downloaded driving instruction data useful for instructing the driver of the equipped vehicle how to drive from an initial location to a destination location, and wherein driving instructions derived at least in part from said downloaded driving instruction data are displayed by a display device of the equipped vehicle for viewing by the driver of the equipped vehicle.

9. The vehicular wireless communication system of claim 8, wherein said driving instructions are displayed by said display device in a step-by-step manner, with at least some driving instruction steps being displayed by said display device after said wireless communication link between said control and the external service provider is disconnected.

10. The vehicular wireless communication system of claim 8, wherein said driving instructions comprise at least two driving instructions with each of said at least two driving instructions being coded or associated with or linked to a respective geographic location, and wherein each driving instruction is displayed by said display device only when the then current actual geographic position of the equipped vehicle at least generally corresponds to the particular geographic location coded or associated with or linked to said each driving instruction.

11. The vehicular wireless communication system of claim 8, wherein said control provides an alert to the driver of the equipped vehicle when the actual geographic position of the equipped vehicle is not where it should be.

12. The vehicular wireless communication system of claim 1, wherein said control comprises, at least in part, an element of a vehicular telematics system.

13. The vehicular wireless communication system of claim 1, wherein said control comprises, at least in part, a link to an element of a portable accessory in the equipped vehicle.

14. The vehicular wireless communication system of claim 1, wherein said user input comprises a vocal input from the driver of the equipped vehicle.

15. The vehicular wireless communication system of claim 1, wherein said at least one accessory comprises a display device of the equipped vehicle and wherein said display device is operable to display information derived from said downloaded data.

16. The vehicular wireless communication system of claim 15, wherein said display device is operable to display at least one of alphanumeric information, textual information, graphical information and icon information.

17. The vehicular wireless communication system of claim 15, wherein said display device comprises one of (a) a multi-pixel display device, (b) a multi-pixel vacuum fluorescent display device, (c) a multi-pixel display device backlit by a plurality of organic light emitting diodes, and (d) a multi-pixel field emission display device.

18. The vehicular wireless communication system of claim 15, wherein said display device is disposed in an interior rearview mirror assembly comprising an electrochromic transflective element having a transflective mirror reflector, and wherein said display device is disposed to the rear of said transflective element and wherein, when said display device is operated, said display device emits light that passes through said transflective mirror reflector of said transflective element, and wherein the presence of said display device is discernible to the driver of the equipped vehicle viewing said transflective element only when said display device is operated.

19. The vehicular wireless communication system of claim 15, wherein said display device comprises a video display device and wherein said video display device comprises a thin film transistor liquid crystal display video screen.

20. A vehicular wireless communication system for a vehicle, said vehicular wireless communication system comprising:
a control in an equipped vehicle operable to communicate with an external service provider via a wireless communication link between the equipped vehicle and the external service provider;
wherein data from the external service provider is downloaded to said control via said wireless communication link;
wherein said data downloaded from the external service provider to said control comprises downloaded driving instruction data useful for instructing the driver of the equipped vehicle how to drive from an initial location to a destination location;
a global positioning system of the equipped vehicle;
at least one accessory of the equipped vehicle comprises a display device of the equipped vehicle and wherein said display device is operable to display driving instructions derived at least in part from said downloaded driving instruction data for viewing by the driver of the equipped vehicle;
wherein said display device is disposed in an interior rearview mirror assembly comprising an electrochromic transflective element having a transflective mirror reflector, and wherein said display device is disposed to the rear of said transflective element and wherein, when said display device is operated, said display device emits light that passes through said transflective mirror reflector of said transflective element, and wherein the presence of said display device is discernible to the driver of the equipped vehicle viewing said transflective element only when said display device is operated; and
wherein said display device comprises a video display device and wherein said video display device comprises a thin film transistor liquid crystal display video screen.

21. The vehicular wireless communication system of claim 20, wherein said control receives a user input from the driver of the equipped vehicle, and responsive thereto, establishes said wireless communication link between the equipped vehicle and the external service provider.

22. The vehicular wireless communication system of claim 20, wherein said control comprises memory for storing downloaded data at least after said wireless communication link established between said control and the external service provider is disconnected.

23. The vehicular wireless communication system of claim 20, wherein said control controls said at least one accessory of the vehicle responsive to a geographic location of the vehicle as determined by said global positioning system of the equipped vehicle.

24. The vehicular wireless communication system of claim 23, wherein said at least one accessory comprises a mirror adjustment system that is operable to at least one of (a) adjust a setting of an interior rearview mirror of the equipped vehicle and (b) adjust a setting of an exterior rearview mirror of the equipped vehicle.

25. The vehicular wireless communication system of claim 20, wherein said driving instructions are displayed by said display device in a step-by-step manner, with at least some driving instruction steps being displayed by said display device after said wireless communication link between said control and the external service provider is disconnected.

26. The vehicular wireless communication system of claim 20, wherein said driving instructions comprise at least two driving instructions with each of said at least two driving instructions being coded or associated with or linked to a respective geographic location, and wherein each driving instruction is displayed by said display device only when the then current actual geographic position of the equipped vehicle at least generally corresponds to the particular geographic location coded or associated with or linked to said each driving instruction.

27. A vehicular wireless communication system for a vehicle, said vehicular wireless communication system comprising:
a control in an equipped vehicle operable to communicate with an external service provider via a wireless communication link between the equipped vehicle and the external service provider;
wherein data from the external service provider is downloaded to said control via said wireless communication link;
wherein said control controls at least one accessory of the vehicle at least in part responsive to said data downloaded from the external service provided to said control; and
wherein said at least one accessory comprises an accessory selected from the group comprising (a) an interior rearview mirror assembly of the equipped vehicle, (b) an exterior rearview mirror assembly of the equipped vehicle, (c) a seat of the equipped vehicle, (d) a video display device of the equipped vehicle and (e) an interior video mirror rearview mirror assembly of the equipped vehicle.

28. The vehicular wireless communication system of claim 27, wherein said control controls said at least one accessory of the vehicle at least in part responsive to a geographic location of the vehicle as determined by a global positioning system of the equipped vehicle.

29. The vehicular wireless communication system of claim 27, wherein said control receives a user input from the driver of the equipped vehicle, and wherein said user input comprises a vocal input from the driver of the equipped vehicle.

30. The vehicular wireless communication system of claim 29, wherein said control, responsive to said user input from the driver of the equipped vehicle, establishes said wireless communication link between the equipped vehicle and the external service provider.

31. The vehicular wireless communication system of claim 27, wherein said at least one accessory comprises a video display device of the equipped vehicle and wherein said video display device is operable to display video information derived from said data downloaded from the external service provided to said control.

32. The vehicular wireless communication system of claim 27, wherein said control comprises memory for storing downloaded data at least after said wireless communication link established between said control and the external service provider is disconnected.

33. A vehicular wireless communication system for a vehicle, said vehicular wireless communication system comprising:
- a control in an equipped vehicle operable to communicate with an external service provider via a wireless communication link between the equipped vehicle and the external service provider;
- wherein said control receives a user input from the driver of the equipped vehicle;
- wherein data from the external service provider is downloaded to said control via said wireless communication link;
- wherein said control controls at least one accessory of the vehicle;
- wherein said at least one accessory comprises a display device of the equipped vehicle;
- wherein said display device is disposed in an interior rearview mirror assembly comprising an electrochromic transflective element having a transflective mirror reflector, and wherein said display device is disposed to the rear of said transflective element and wherein, when said display device is operated, said display device emits light that passes through said transflective mirror reflector of said transflective element, and wherein the presence of said display device is discernible to the driver of the equipped vehicle viewing said transflective element only when said display device is operated; and
- wherein said display device comprises a video display device and wherein said video display device comprises a thin film transistor liquid crystal display video screen.

34. The vehicular wireless communication system of claim 33, wherein said data downloaded from the external service provided to said control comprises downloaded driving instruction data useful for instructing the driver of the equipped vehicle how to drive from an initial location to a destination location.

35. The vehicular wireless communication system of claim 34, wherein said display device is operable to display driving instructions derived at least in part from said downloaded driving instruction data for viewing by the driver of the equipped vehicle.

36. The vehicular wireless communication system of claim 33, wherein said control controls said display device responsive to a geographic location of the vehicle as determined by a global positioning system of the equipped vehicle.

37. The vehicular wireless communication system of claim 33, wherein said user input comprises a vocal input from the driver of the equipped vehicle.

38. The vehicular wireless communication system of claim 33, wherein said control, responsive to said user input from the driver of the equipped vehicle, establishes said wireless communication link between the equipped vehicle and the external service provider.

39. The vehicular wireless communication system of claim 38, wherein said control comprises memory for storing downloaded data at least after said wireless communication link established between said control and the external service provider is disconnected.

* * * * *

UNITED STATES PATENT AND TRADEMARK OFFICE
CERTIFICATE OF CORRECTION

PATENT NO. : 8,000,894 B2  
APPLICATION NO. : 12/908481  
DATED : August 16, 2011  
INVENTOR(S) : Taylor et al.

Page 1 of 1

It is certified that error appears in the above-identified patent and that said Letters Patent is hereby corrected as shown below:

<u>Column 14</u>  
Line 22, "minors" should be "mirrors"

Signed and Sealed this  
Twelfth Day of March, 2013

Teresa Stanek Rea  
*Acting Director of the United States Patent and Trademark Office*